US011652605B2

(12) United States Patent
Turner et al.

(10) Patent No.: US 11,652,605 B2
(45) Date of Patent: May 16, 2023

(54) ADVANCED NON-FUNGIBLE TOKEN BLOCKCHAIN ARCHITECTURE

(71) Applicant: PayPal, Inc., San Jose, CA (US)

(72) Inventors: Bradley Turner, Albany, CA (US); Michael Jim Tien Chan, Cupertino, CA (US); Jonathan Michael Padilla, San Jose, CA (US); Liam Julian DiGregorio, Manhattan Beach, CA (US); Charles Gabriel Neale Dalton, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 257 days.

(21) Appl. No.: 17/183,047

(22) Filed: Feb. 23, 2021

(65) Prior Publication Data
US 2022/0271915 A1 Aug. 25, 2022

(51) Int. Cl.
*H04L 9/06* (2006.01)
*G06F 40/211* (2020.01)
*H04L 9/00* (2022.01)

(52) U.S. Cl.
CPC .......... *H04L 9/0618* (2013.01); *G06F 40/211* (2020.01); *H04L 9/0643* (2013.01); *H04L 9/50* (2022.05)

(58) Field of Classification Search
CPC ....... H04L 9/0618; H04L 9/0643; H04L 9/50; H04L 9/3247; H04L 9/3263; H04L 2209/56; G06F 40/211
See application file for complete search history.

(56) References Cited

U.S. PATENT DOCUMENTS 10,540,654 B1 * 1/2020 James ................. G06Q 20/223
11,398,911 B1 * 7/2022 Gunning ............. G06Q 20/363
(Continued)

FOREIGN PATENT DOCUMENTS

WO WO-2020041411 A2 * 2/2020 ............. G06F 16/27

OTHER PUBLICATIONS

Chirtoaca, D., Ellul, J., Azzopardi, G. A framework for creating deployable smart contracts for non-fungible tokens on the Ethereum blockchain. 2020. (Year: 2020).*
International Search Report and Written Opinion for Application No. PCT/US2022/17359 dated Jul. 6, 2022, 12 pages.
(Continued)

*Primary Examiner* — Taghi T Arani
*Assistant Examiner* — Blake I Narramore
(74) *Attorney, Agent, or Firm* — Haynes and Boone, LLP

(57) ABSTRACT

Methods and systems described herein may implement non-fungible tokens that implement a programmable grammar-based syntax in a variety of environments. In an embodiment, a first non-fungible token that implements a programmable grammar-based syntax standard and includes a first updatable programmable section is generated. The first non-fungible token includes at least one of first executable instructions or first data, and a first portion of the at least one of the first executable instructions or the first data is stored, according to the grammar-based syntax standard, in the first updatable programmable section. The first non-fungible token may then be stored at a first blockchain address on a blockchain, and the first portion of the at least one of the first executable instructions or the first data in the first updatable programmable section of the first non-fungible token is subsequently changed to at least one of second executable instructions or second data.

20 Claims, 13 Drawing Sheets

(56) References Cited

U.S. PATENT DOCUMENTS

| | | | | |
|---|---|---|---|---|
| 2020/0034457 | A1* | 1/2020 | Brody | H04L 9/0819 |
| 2020/0351092 | A1* | 11/2020 | Madhuram | G06F 16/00 |
| 2020/0351399 | A1* | 11/2020 | Young | G06Q 10/00 |
| 2021/0165890 | A1* | 6/2021 | Schvey | G06F 3/0655 |
| 2022/0027992 | A1* | 1/2022 | Blevins | G06Q 20/3678 |
| 2022/0058706 | A1* | 2/2022 | Gordon | H04L 63/12 |
| 2022/0173893 | A1* | 6/2022 | Basu | H04L 9/3297 |
| 2022/0210061 | A1* | 6/2022 | Simu | H04L 9/3239 |

OTHER PUBLICATIONS

Fabian Vogelsteller, Vitalik Buterin, "EIP-20: ERC-20 Token Standard," Ethereum Improvement Proposals, No. 20, Nov. 2015, [Online serial], Available: https://eips.ethereum.org/EIPS/eip-20.

William Entriken, Dieter Shirley, Jacob Evans, Nastassia Sachs, "EIP-721: ERC-721 Non-Fungible Token Standard," Ethereum Improvement Proposals, No. 721, Jan. 2018, [Online serial], Available: https://eips.ethereum.org/EIPS/eip-721.

"ERC994: Delegated Non-Fungible Token Standard #994," ethereum/EIPs, 2021 GitHub, Inc., Retrieved from: https://github.com/ethereum/EIPs/issues/994.

Matt Lockyer, Nick Mudge, Jordan Schalm, "EIP-998: ERC-998 Composable Non-Fungible Token Standard [Draft]," Ethereum Improvement Proposals, No. 998, Jul. 2018. [Online serial]. Available: https://eips.ethereum.org/EIPS/eip-998.

Witek Radomski, Andrew Cooke, Philippe Castonguay, James Therien, Eric Binet, Ronan Sandford, "EIP-1155: ERC-1155 Multi Token Standard," Ethereum Improvement Proposals, No. 1155, Jun. 2018, [Online serial], Available: httos://eips.ethereum.org/EIPS/eip-1155.

* cited by examiner

*NFT sample in json*

```
class NFT:
{
    "NFT_00":
        {
            "ID": "ML_23",
            "certificate": { "....."}
            "permit":
                {
                    "subject": "role_77",
                    "interface":
                            "QR_code": {<QR_encrypted>}, // requires key to unlock
                    "object":
                            { // assume not secret
                            "room": "0077",
                            "computer": "0011",
                            "APIs":
                            {
                            "data_file_00aa_access", "data_field_0055_update", "data_field_0023_view", ....,
                            },
                            "data":
                            {
                            "file_00aa", "field_0055", "field_0023", ....,
                            },
                            },
                    "shareable":
                    {
                    "APIs": "data_field_0023_view",
                    "data": "file_00aa", "field_0023", ....,
                    "shared_parties_id": {<digital certificates of parties>},
                    "shared_NFT_id": { .... }, // e.g. for Private Set Intersection (PSI) or stated fields, etc
                    "conditions": {"not after 1800hr", ....}
                    }, "signature": .... // this is changed when the fields are updated, and has to be re-packaged and re-signed for
            authentication of the NFT

}
```

Labels: 800, 802, 804, 806, 808, 810, 812, 814, 816

FIG. 8

ADVANCED NON-FUNGIBLE TOKEN BLOCKCHAIN ARCHITECTURE

TECHNICAL FIELD

The present disclosure generally relates to blockchain technology, and more specifically, the present disclosure relates to systems and methods for implementing non-fungible tokens that implement programmable grammar-based syntax in a blockchain environment, according to various embodiments.

BACKGROUND

Some blockchains feature smart contract functionality and include a decentralized replicated virtual machine that may execute smart contracts such as scripts and decentralized applications. Various types of tokens may be generated on these blockchains by these smart contracts for various purposes. Each token type may implement a respective token standard. However, these token standards are limited in their capabilities and functionality.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings:

FIG. 8 illustrates a non-fungible token that implements programmable grammar-based syntax generated during the method of FIG. 7 according to an embodiment of the present disclosure.

DETAILED DESCRIPTION

Figure 1:
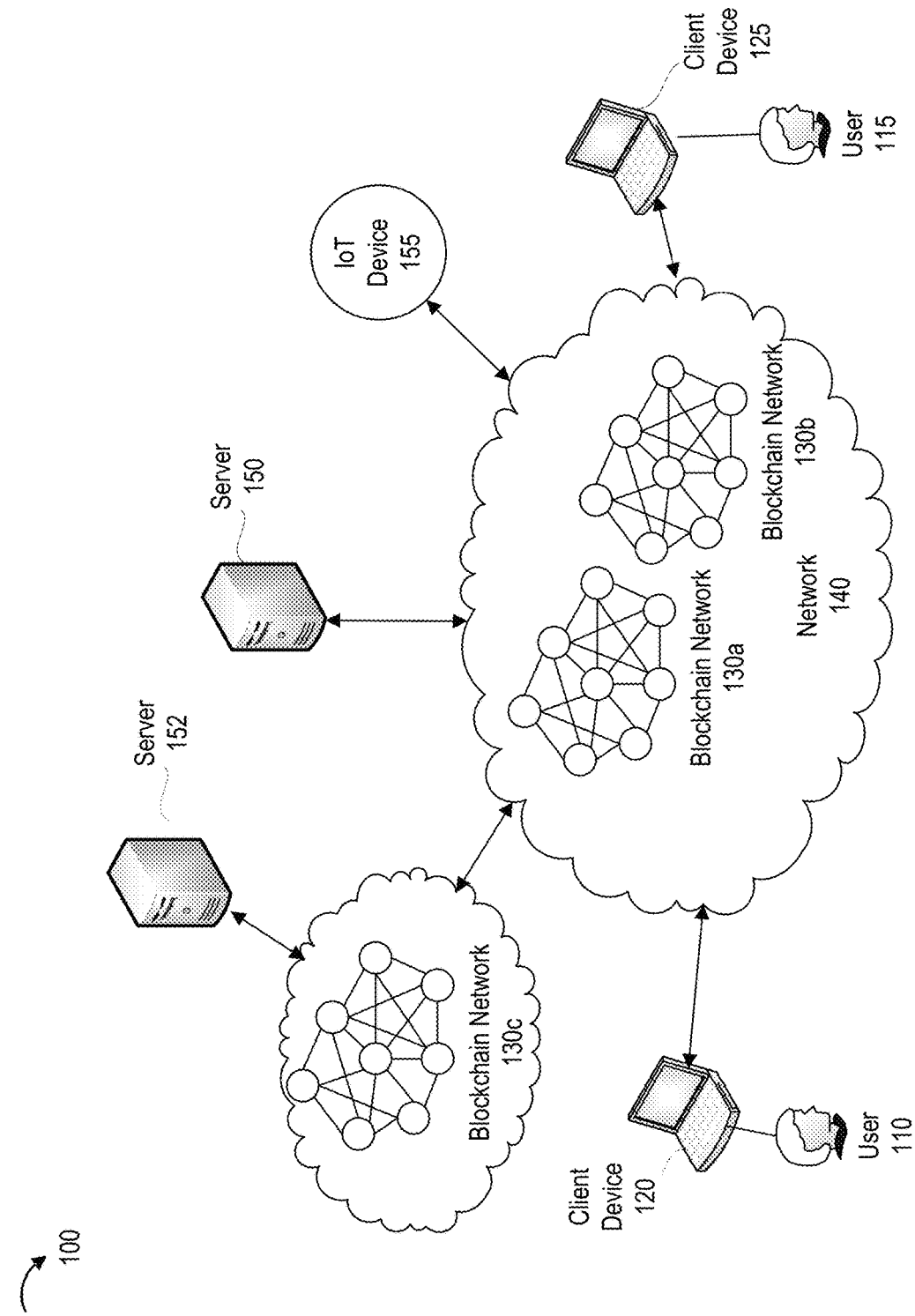
FIG. 1 is a block diagram illustrating a computing architecture for facilitating one or more blockchain based transactions according to an embodiment of the present disclosure.

FIGS. 1-6 and FIGS. 11 and 12 describe certain aspects of blockchain operations, according to some embodiments. FIGS. 7-10 describe certain other particular aspects relating to non-fungible token generation and use according to the programmable grammar-based syntax token standard, according to some embodiments.

In various embodiments of the present disclosure, systems and methods are disclosed for generating a non-fungible token with an advanced architecture that implements programmable grammar-based syntax. Applicant's programmable grammar-based tokens provide greater functionality to other approaches for non-fungible tokens (such as simple non-hierarchical tag-based approaches).

A token may implement a token standard; for example, a token may be implemented according to the ERC-20 standard, the ERC-721 standard, the ERC-994 standard, the ERC-998 standard, the ERC-1155 standard, and/or any other token standard configured for the Ethereum blockchain network or any other blockchain network that includes a virtual machine for executing contract bytecode on its blockchain as would be apparent to one of skill in the art in possession of the present disclosure. Each token standard may have different requirements of features that a token must have to be considered a token that implements that standard and that can be used by smart contracts or applications that also are generated according to that token standard.

Tokens and smart contracts that implement various token standards are tag-based and derived by Application Programming Interfaces (APIs). Thus, composability of these token standards occurs with an API. Composability means that the token has the ability to combine parts or elements. For example, if a first smart contract generates a token that implements the ERC-20 standard, that first smart contract may be used by other smart contracts or that first smart contract may interface with existing smart contracts on the blockchain to use or interact with the existing smart contracts from within the first smart contract utilizing APIs. However, such tag-based tokens are much more difficult to address the notions of shareability and trustability when utilizing APIs for composability of tokens. The notions of shareability and trustability assist in bridging the gap between the digital world and the physical world and allowing disparate, siloed entities to communicate with each other. As such, the present disclosure describes a non-fungible token that leverages blockchain and digital assets to interact with both the physical world and the digital world.

In various embodiments of the present disclosure, a non-fungible token that implements a programmable grammar-based syntax standard rather than a tag-based approach of other token standards is described. For example, the programmable grammar-based syntax standard may allow for the use of mathematical operators (e.g., addition, subtraction, unions, intersections, bridges, and/or other mathematical operators that would be apparent to one of skill in the art in possession of the present disclosure), to describe relationships (e.g., Venn relationships) between the non-fungible token and/or smart contracts that implement the programmable grammar-based syntax standard and other tokens (e.g., fungible or non-fungible) and/or smart contracts that implement the programmable grammar-based syntax standard of the present disclosure.

In contrast, other conventional token standards do not use mathematical operators in the manner disclosed herein, and instead rely on proprietary tags such as function calls to other tokens and/or contracts. As such, the non-fungible token and/or smart contracts that implement the programmable grammar-based syntax standard do not require the use of APIs. The non-fungible token that implements the programmable grammar-based syntax standard may form non-fungible token attribute associations to form the means of interconnectedness for interoperability to fulfill "Express" and "Suppress" modes of the shareability and associativity of the non-fungible tokens. For example, data or instructions may be expressed or made available for a first entity but may be suppressed or unavailable to another entity. The programmable grammar-based syntax standard also enables smart contracts to be embedded between and with the non-fungible tokens. Furthermore, the programmable grammar-based syntax standard allows the non-fungible token structure to define functions, instead of limited aspects (e.g., (non)-transferability, (non)-divisibility, mintability, uniqueness (i.e. (non)-singleton), (non)-burnability, etc.) as other token standards may require, and thus the extensibility of these non-fungible tokens can be more programmatically managed and agnostic (e.g., Turning complete). These and other advantages may apparent to one of skill in the art in possession of the present disclosure.

In the following description of the various embodiments, reference is made to the accompanying drawings identified above and which form a part hereof, and in which is shown by way of illustration various embodiments in which aspects described herein may be practiced. It is to be understood that other embodiments may be utilized, and structural and functional modifications may be made without departing from the scope described herein. Various aspects are capable of other embodiments and of being practiced or being carried out in various different ways.

In its broadest sense, blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others where the distributed ledger represents each transaction and where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. (Note that other digital asset transfers are enabled by other blockchain schemes as well; cryptocurrency examples are used variously herein for ease of illustration and understanding) The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger. Many uses of blockchain distributed ledgers other than cryptocurrency are possible, of course, as further discussed below.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser. Other data as well as other digital assets may be maintained, recorded, and/or transferred according to various blockchain schemes.

Implementations of the present disclosure will now be described in detail with reference to the accompanying Figures.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

As discussed above, the distributed ledger in a blockchain framework is stored, maintained, and updated in a peer-to-peer network. In one example the distributed ledger maintains a number of blockchain transactions. FIG. 1 shows an example non-fungible token system 100 for facilitating a blockchain transaction. The non-fungible token system 100 includes a first client device 120, a second client device 125, a first server 150, and an Internet of Things (IoT) device 155 interconnected via a network 140. The first client device 120, the second client device 125, the first server 150 may be a computing device 1205 described in more detail with reference to FIG. 12. The IoT device 155 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. The network 140 may be any of a variety of available networks, such as the Internet, and represents a worldwide collection of networks and gateways to support communications between devices connected to the network 140. The non-fungible token system 100 may also comprise one or more distributed or peer-to-peer (P2P) networks, such as a first, second, and third blockchain network 130a-c (generally referred to as blockchain networks 130). As shown in FIG. 1, the network 140 may comprise the first and second blockchain networks 130a and 130b. The third blockchain network 130c may be associated with a private blockchain as described below with reference to FIG. 2, and is thus, shown separately from the first and second blockchain networks 130*a* and 103*b*. Each blockchain network 130 may comprise a plurality of interconnected devices (or nodes) as described in more detail with reference to FIG. 2. As discussed above, a ledger, or blockchain, is a distributed database for maintaining a growing list of records comprising any type of information. A blockchain, as described in more detail with reference to FIG. 3, may be stored at least at multiple nodes (or devices) of the one or more blockchain networks 130.

In one example, a blockchain based transaction may generally involve a transfer of data or value between entities, such as the first user 110 of the first client device 120 and the second user 115 of the second client device 125 in FIG. 1. The server 150 may include one or more applications, for example, a transaction application configured to facilitate the transaction between the entities by utilizing a blockchain associated with one of the blockchain networks 130. As an example, the first user 110 may request or initiate a transaction with the second user 115 via a user application executing on the first client device 120. The transaction may be related to a transfer of value or data from the first user 110 to the second user 115. The first client device 120 may send a request of the transaction to the server 150. The server 150 may send the requested transaction to one of the blockchain networks 130 to be validated and approved as discussed below.

Blockchain Network

Figure 2:
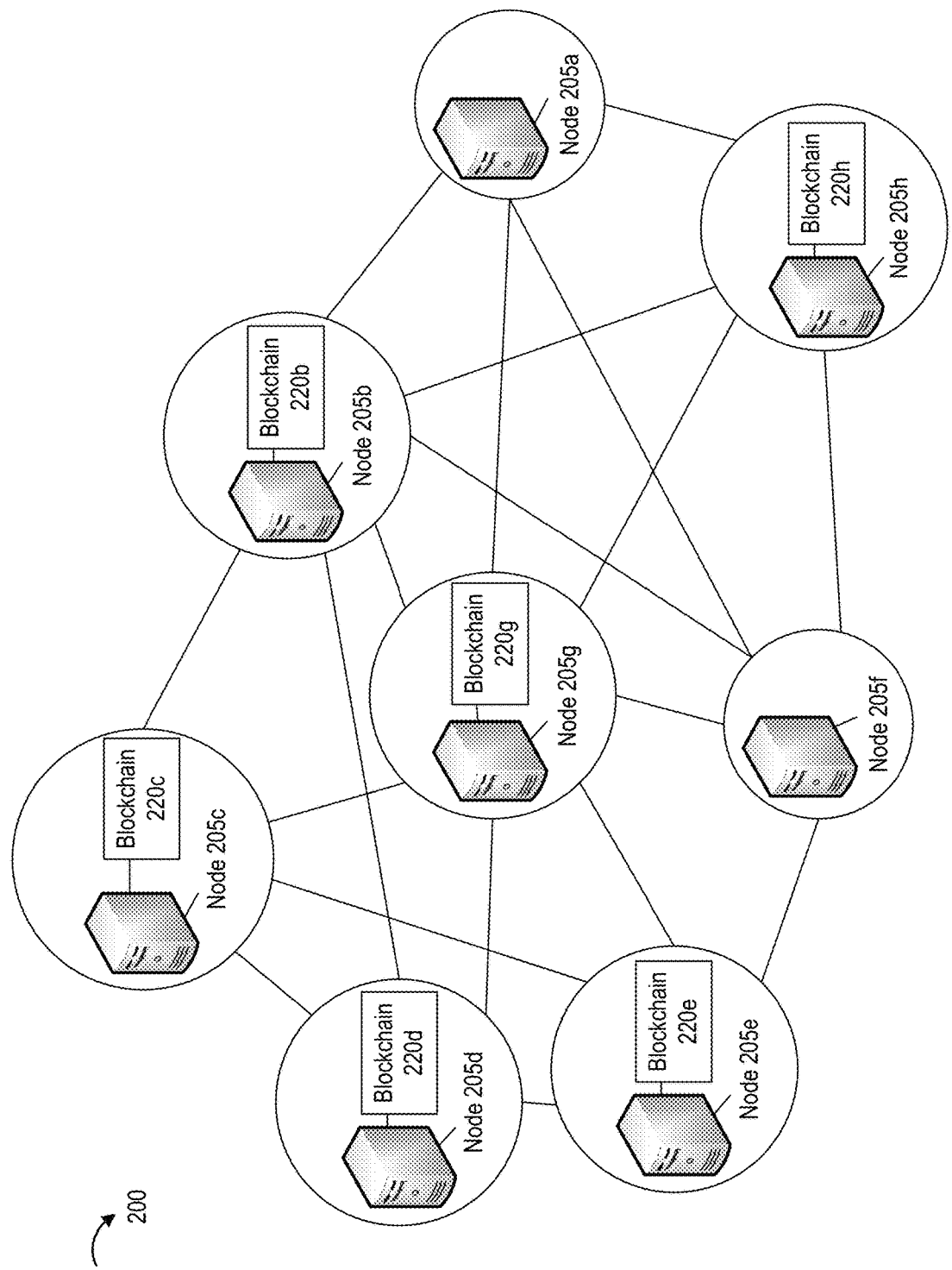
FIG. 2 is a block diagram illustrating an example blockchain network of the computer architecture of FIG. 1 according to an embodiment of the present disclosure.
Figure 3:
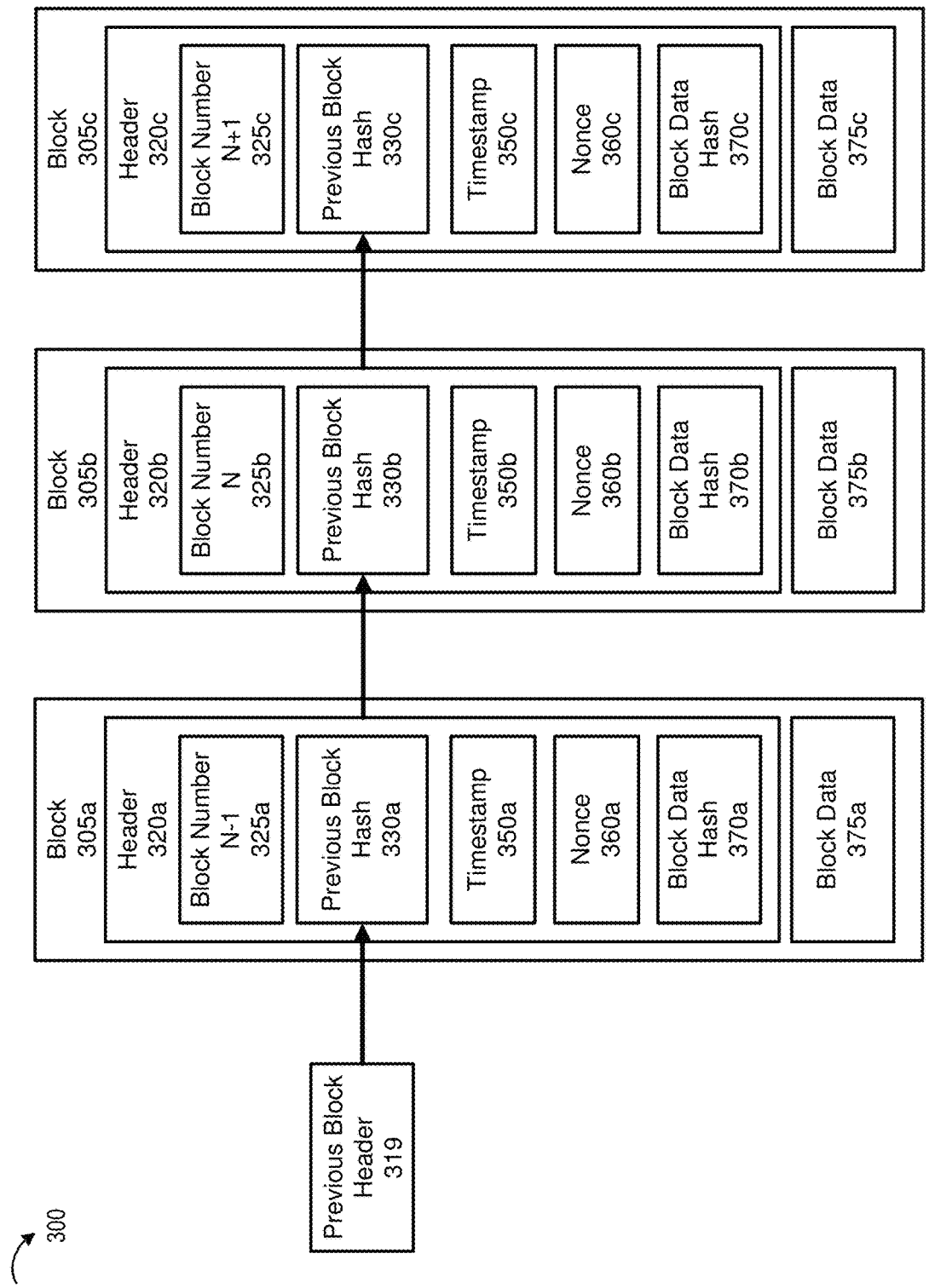
FIG. 3 is a schematic illustrating an example blockchain according to an embodiment of the present disclosure.

FIG. 2 shows an example blockchain network 200 comprising a plurality of interconnected nodes or devices 205*a-h* (generally referred to as nodes 205). Each of the nodes 205 may comprise a computing device 1205 described in more detail with reference to FIG. 12. Although FIG. 2 shows a single device, each of the nodes 205 may comprise a plurality of devices (e.g., a pool). The blockchain network 200 may be associated with a blockchain 220. Some or all of the nodes 205 may replicate and save an identical copy of the blockchain 220. For example, FIG. 3 shows that the nodes 205*b-e* and 205*g-h* store copies of the blockchain 220. The nodes 205*b-e* and 205*g-h* may independently update their respective copies of the blockchain 220 as discussed below.

Blockchain Node Types

Blockchain nodes, for example, the nodes 205, may be full nodes or lightweight nodes. Full nodes, such as the nodes 205*b-e* and 205*g-h*, may act as a server in the blockchain network 200 by storing a copy of the entire blockchain 220 and ensuring that transactions posted to the blockchain 220 are valid. The full nodes 205*b-e* and 205*g-h* may publish new blocks on the blockchain 220. Lightweight nodes, such as the nodes 205*a* and 205*f*, may have fewer computing resources than full nodes. For example, IoT devices often act as lightweight nodes. The lightweight nodes may communicate with other nodes 205, provide the full nodes 205*b-e* and 205*g-h* with information, and query the status of a block of the blockchain 220 stored by the full nodes 205*b-e* and 205*g-h*. In this example, however, as shown in FIG. 2, the lightweight nodes 205*a* and 205*f* may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

As discussed above, a blockchain 220 may be associated with a blockchain network 200. FIG. 3 shows an example blockchain 300. The blockchain 300 may comprise a plurality of blocks 305*a*, 305*b*, and 305*c* (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205*b-e* and 205*g-h*, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320*a*, 320*b*, and 320*c* (generally referred to as headers 320) and block data 375*a*, 375*b*, and 375*c* (generally referred to as block data 375). The headers 320 may comprise metadata associated with their respective blocks 305. For example, the headers 320 may comprise a respective block number 325*a*, 325*b*, and 325*c*. As shown in FIG. 3, the block number 325*a* of the block 305*a* is N−1, the block number 325*b* of the block 305*b* is N, and the block number 325*c* of the block 305*c* is N+1. The headers 320 of the blocks 305 may include a data field comprising a block size (not shown).

The blocks 305 may be linked together and cryptographically secured. For example, the header 320*b* of the block N (block 305*b*) includes a data field (previous block hash 330*b*) comprising a hash representation of the previous block N−1's header 320*a*. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320*c* of the block N+1 (block 305*c*) includes a data field (previous block hash 330*c*) comprising a hash representation of block N's (block 305*b*) header 320*b*.

The headers 320 of the blocks 305 may also include data fields comprising a hash representation of the block data, such as the block data hash 370*a-c*. The block data hash 370*a-c* may be generated, for example, by a Merkle tree and by storing the hash or by using a hash that is based on all of the block data. The headers 320 of the blocks 305 may comprise a respective nonce 360*a*, 360*b*, and 360*c*. In some implementations, the value of the nonce 360*a-c* is an arbitrary string that is concatenated with (or appended to) the hash of the block. The headers 320 may comprise other data, such as a difficulty target.

The blocks 305 may comprise a respective block data 375a, 375b, and 375c (generally referred to as block data 375). The block data 375 may comprise a record of validated transactions that have also been integrated into the blockchain network 200 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 1, the server 150 may include one or more applications, for example, a transaction application configured to facilitate a blockchain transaction between entities. The entities may include users, devices, etc. The first user 110 may request or initiate a transaction with the second user 115 via a user application executing on the first client device 120. The transaction may be related to a transfer of value or data from the first user 110 to the second user 115. The value or data may represent money, a contract, property, records, rights, status, supply, demand, alarm, trigger, or any other asset that may be represented in digital form. The transaction may represent an interaction between the first user 110 and the second user 115.

Figure 4:
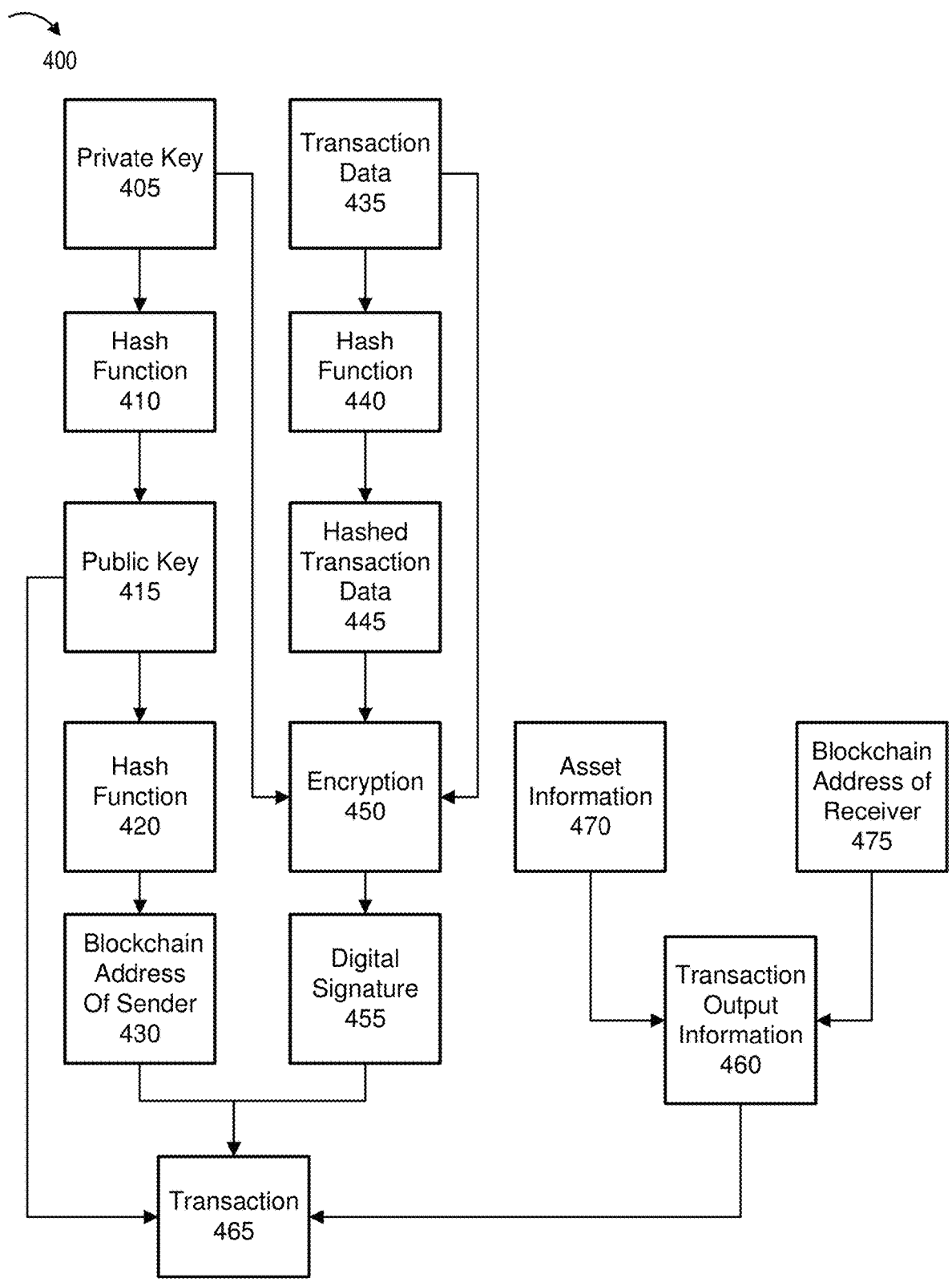
FIG. 4 illustrates a diagram of an example transaction message according to an embodiment of the present disclosure.

FIG. 4 is a diagram of a transaction 465 generated by the transaction application. The transaction 465 may include a public key 415, a blockchain address 430 associated with the first user 110, a digital signature 455, and transaction output information 460. The transaction application may derive a public key 415 from a private key 405 of the first user 110 by applying a cryptographic hash function 410 to the private key 405. The cryptographic hash function 410 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first user 110, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first user 110 is the originator of the transaction 465, the transaction application may generate the digital signature 455 for the transaction data 435 using the private key 405 of the first user 110. The transaction data 435 may include information about the assets to be transferred and a reference to the sources of the assets, such as previous transactions in which the assets were transferred to the first user 110 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 110 resulting in the digital signature 455. The transaction output information 460 may include asset information 470 and an address or identifier for the second user, such as the blockchain address 475. The transaction 465 may be sent from the first client device 120 to the server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 110, shown in FIG. 4 as the blockchain address 430 of sender, may include an alphanumeric string of characters derived from the public key 415 of the first user 110 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
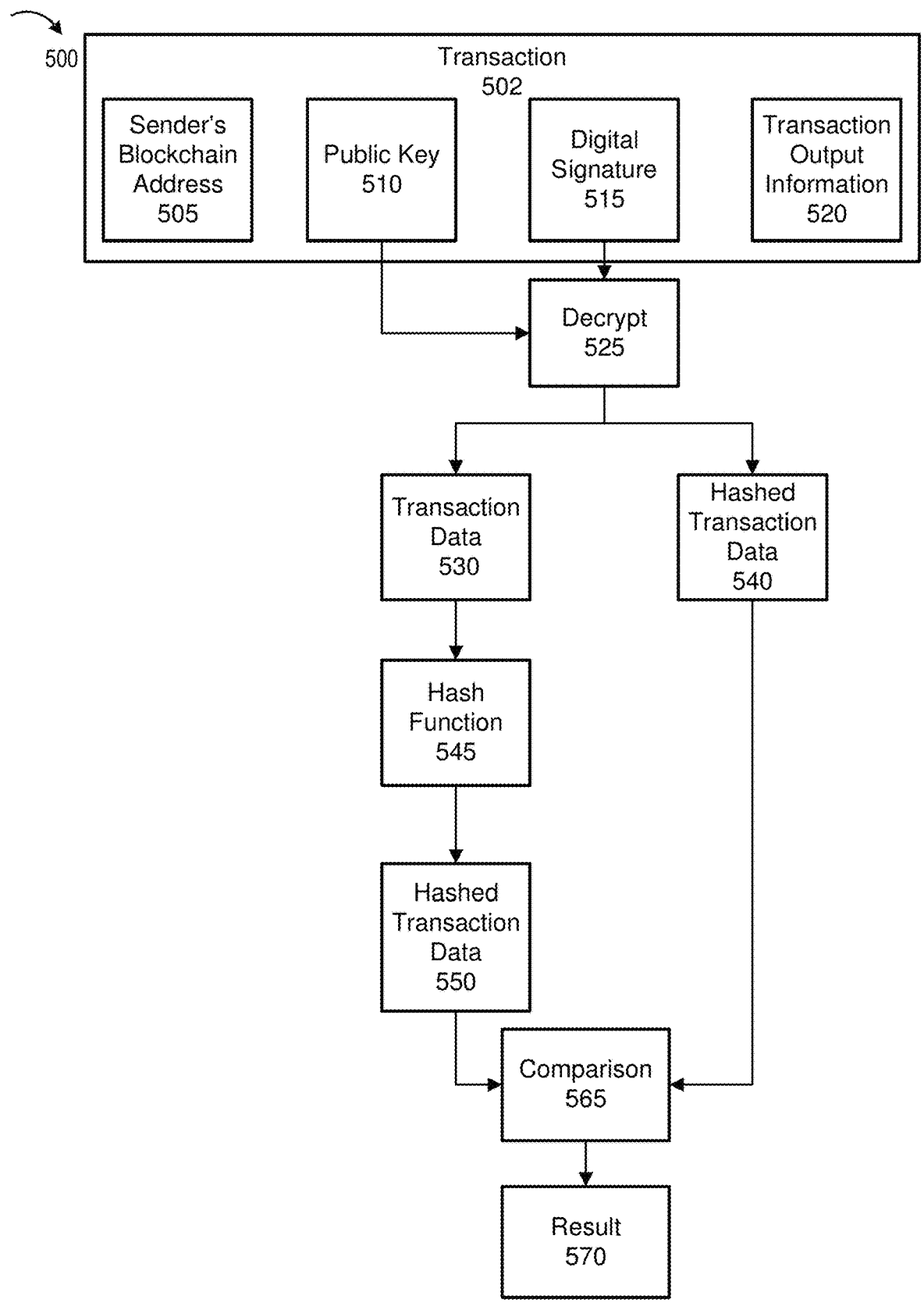
FIG. 5 shows an example transaction broadcast on the blockchain network according to an embodiment of the present disclosure.

The server 150 may receive transactions from users of the blockchain network 130. The transactions may be submitted to the server 150 via desktop applications, smartphone applications, digital wallet applications, web services, or other software applications. The server 150 may send or broadcast the transactions to the blockchain network 130. FIG. 5 shows an example transaction 502 broadcast by the server 150 to the blockchain network 130. The transaction 502 may be broadcast to multiple nodes 205 of the blockchain network 130. Typically, once the transaction 502 is broadcast or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcast to one or more specific nodes based on criteria related to the node's geography, history, reputation, market conditions, docket/delay, technology platform. The rules may be dynamically modified or updated (e.g. turned on or off) to address issues such as latency, scalability and security conditions. A transaction may be broadcast to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first user 110 is the originator of the transaction 465 by including the digital signature 455.

The node 205 may decrypt the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205f may create a first block comprising transactions "A," "B," and "C." Another full node 205b may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access a user's public/private keys may access the user's assets. While the assets may be recorded on the blockchain, the user may not be able to access them without the private key.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by the validation nodes 205 of the blockchain network 130.

In a proof of work consensus model, a node validates a transaction, for example, by running a check or search through the current ledger stored in the blockchain. The node will create a new block for the blockchain that will include the data for one or more validated transactions (see, e.g., block data 375 of FIG. 3). In a blockchain implementation such as Bitcoin, the size of a block is constrained. Referring back to FIG. 3, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally-intensive operation is needed at the node to determine an appropriate nonce value through a "brute force" trial-and-error method.

Once a successful nonce value is determined, the completed block is published to the blockchain network for validation. If validated by a majority of the nodes in the block chain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue the return causes a delay in completing the transaction. Reducing the time to complete a transaction may be important. A set of blockchain rules, or renumeration/compensation for a node to process the returned transaction may determine how a returned transaction is to treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcast to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below. The proof of stake model is generally less computationally intensive that the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g. in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcast to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a fork. This type of fork may be resolved by the longest chain rule of the proof of work consensus model. According to the longest chain rule, if two versions of the blockchain exist, then the network the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute the update blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain Based Application: Cryptocurrency

Cryptocurrency is a medium of exchange that may be created and stored electronically in a blockchain, such as a the blockchain 130a in FIG. 1. Bitcoin is one example of cryptocurrency, however there are several other cryptocurrencies. Various encryption techniques may be used for creating the units of cryptocurrency and verifying transactions. As an example, the first user 110 may own 10 units of a cryptocurrency. The blockchain 130a may include a record indicating that the first user 110 owns the 10 units of cryptocurrency. The first user 110 may initiate a transfer of the 10 units of cryptocurrency to the second user 115 via a wallet application executing on the first client device 120. The wallet application may store and manage a private key of the first user 110. Examples of the wallet device include a personal computer, a laptop computer, a smartphone, a personal data assistant (PDA), etc.

Figure 6A:
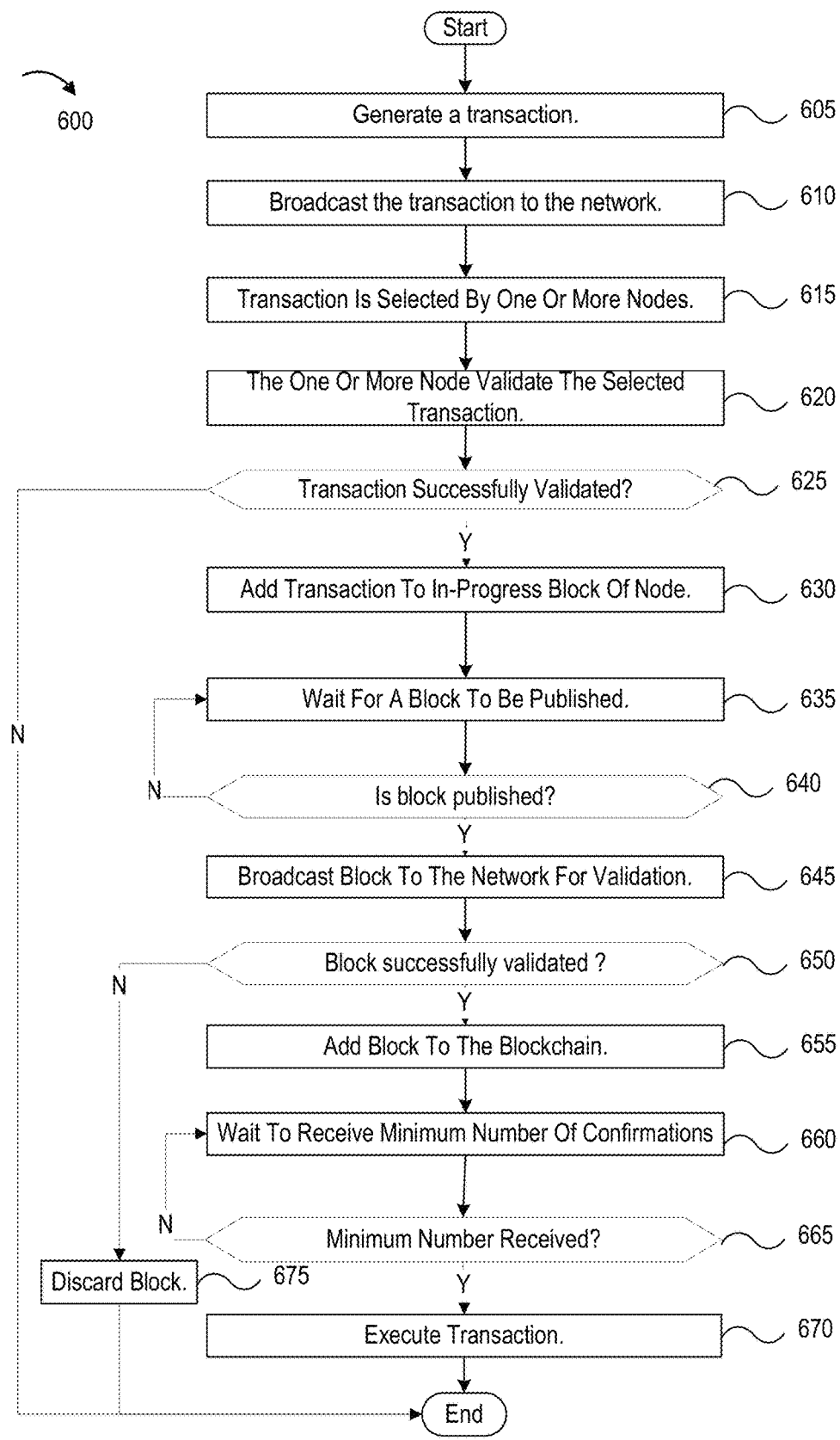
FIG. 6A is a flow diagram showing steps of an example method for performing a blockchain based transaction according to an embodiment of the present disclosure.

FIG. 6A is a flow diagram showing steps of an example method 600 for performing a blockchain transaction between entities, such as the first user 110 of the first client device 120 and the second user 115 of the second client device 125 in FIG. 1. The steps of the method 600 may be performed by any of the computing devices shown in FIG. 1. Alternatively or additionally, some or all of the steps of the method 600 may be performed by one or more other computing devices. Steps of the method 600 may be modified, omitted, and/or performed in other orders, and/or other steps added.

At step 605, the wallet application may generate transaction data for transferring the 10 units of cryptocurrency from the first user 110 to the second user 115. The wallet application may generate a public key for the transaction using the private key of the first user 110. In order to indicate that the first user 110 is the originator of the transaction, a digital signature may also be generated for the transaction using the private key of the first user 110. As discussed with reference to FIG. 4, the transaction data may include information, such as a blockchain address 430 of the sender, the digital signature 455, transaction output information 460, and the public key 415 of the sender. The transaction data may be sent to the server 150 from the first client device 120.

The server 150 may receive the transaction data from the first client device 120. At step 610, the server 150 may broadcast the transaction to the blockchain network 130a. The transaction may be received by one or more nodes 205 of the blockchain network 130a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. Validating the transaction may include determining whether the transaction is legal or conforms to a pre-defined set of rules for that transaction, establishing user authenticity, and establishing transaction data integrity. At step 625, if the transaction is successfully validated by a node 205, the validated transaction is added to a block being constructed by that node 205. As discussed above, since different nodes 205 may choose to validate different transactions, different nodes 205 may build or assemble a block comprising different validated transactions. Thus, the transaction associated with the first user 110 transferring 10 units of cryptocurrency to the second user 115 may be included in some blocks and not others.

At step 635, the blockchain network 130a may wait for a block to be published. Validated transactions may be added to the block being assembled by a node 205 until it reaches a minimum size specified by the blockchain. If the blockchain network 130a utilizes a proof of work consensus model, then the nodes 205 may compete for the right to add their respective blocks to the blockchain by solving a complex mathematical puzzle. The node 205 that solves its puzzle first wins the right to publish its block. As compensation, the winning node may be awarded a transaction fee associated with the transaction (e.g., from the wallet of the first user 110). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining." At step 640, if a block has not been published, then the method 600 returns to step 635 and waits for a block to be published.

However, at step 640, if a block has been published, then the method 600 proceeds to step 645.

At step 645, the published block is broadcast to the blockchain network 130a for validation. At step 650, if the block is validated by a majority of the nodes 205, then at step 655, the validated block is added to the blockchain 220. However, at step 650, if the block is not validated by a majority of the nodes 205, then the method 600 proceeds to step 675. At step 675, the block is discarded and the transactions in the discarded block are returned back to the queue. The transactions in the queue may be selected by one or more nodes 205 for the next block. The node 205 that built the discarded block may build a new next block.

At step 660, if the transaction was added to the blockchain 220, the server 150 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and assets from the first user 110 may be transferred to the second user 115. For example, the 10 units of cryptocurrency owned by the first user 110 may be transferred from a financial account of the first user 110 to a financial account of the second user 115 after the transaction receives at least three confirmations.

Smart Contracts

A smart contract as discussed herein is an agreement that is stored in a blockchain and automatically executed when the agreement's predetermined terms and conditions are met. The terms and conditions of the agreement may be visible to other users of the blockchain. When the predefined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, the first user 110 (also referred to as tenant 110) may rent an apartment from the second user 115 (also referred to as landlord 115). A smart contract may be utilized between the tenant 110 and the landlord 115 for payment of the rent. The smart contract may indicate that the tenant 110 agrees to pay next month's rent of $1000 by the $28^{th}$ of the current month. The agreement may also indicate that if the tenant 110 pays the rent, then the landlord 115 provides the tenant 110 with an electronic receipt and a digital entry key to the apartment. The agreement may also indicate that if the tenant 110 pays the rent by the $28^{th}$ of the current month, then on the last day of the current month, both the entry key and the rent are released respectively to the tenant 110 and the landlord 115.

Figure 6B:
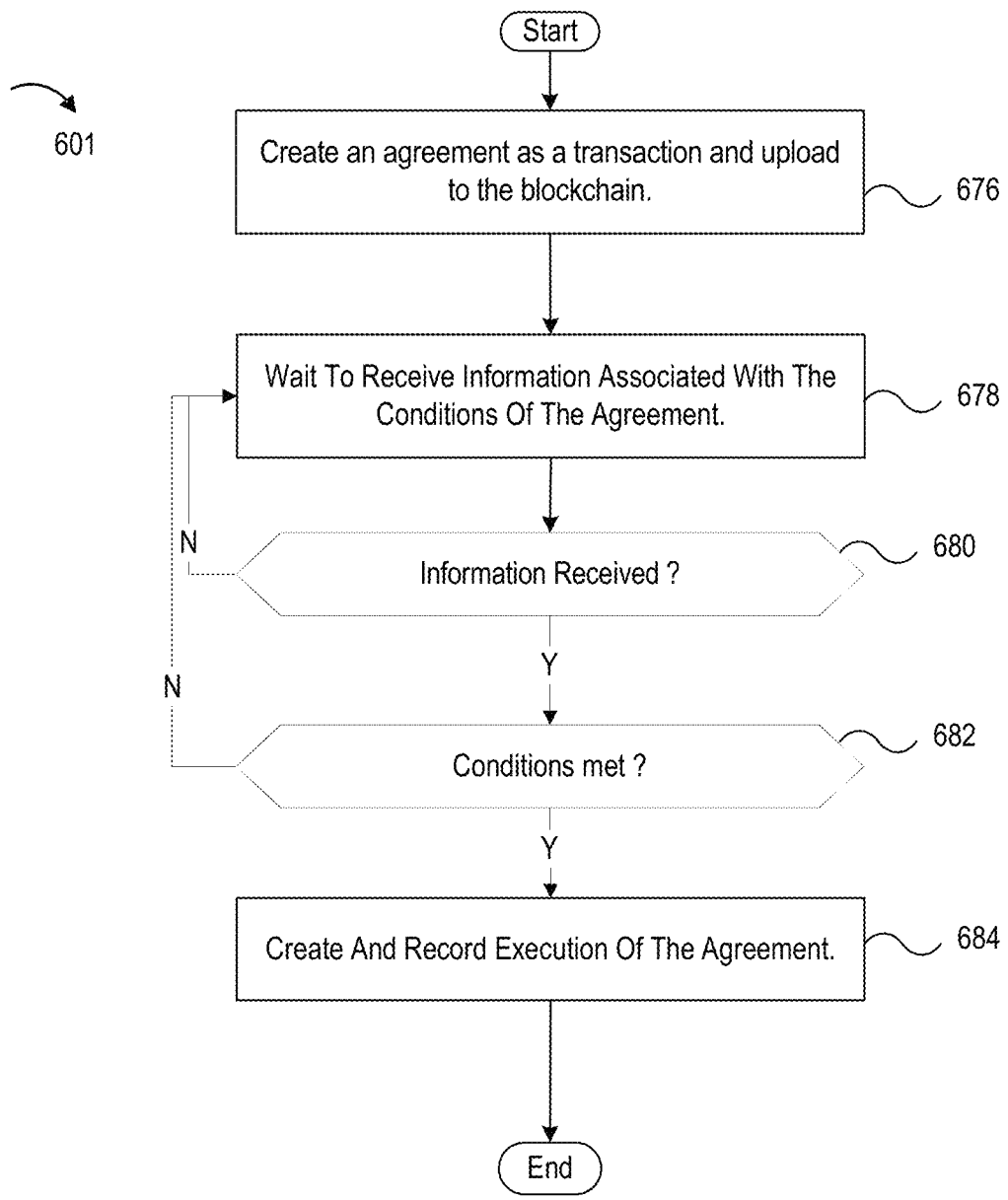
FIG. 6B is a flow diagram showing steps of an example method for performing a blockchain based transaction using a smart contract according to an embodiment of the present disclosure.

FIG. 6B is a flow diagram showing steps of an example method 601 for performing a smart contract transaction between entities, such as the tenant 110 and the landlord 115. The steps of the method 601 may be performed by any of the computing devices shown in FIG. 1. Alternatively or additionally, some or all of the steps of the method 601 may be performed by one or more other computing devices. Steps of the method 601 may be modified, omitted, and/or performed in other orders, and/or other steps added.

At step 676, the agreement or smart contract between the tenant 110 and the landlord 115 may be created and then submitted to the blockchain network 130a as a transaction. The transaction may be added to a block that is mined by the nodes 205 of the blockchain network 130a, the block comprising the transaction may be validated by the blockchain network 130a and then recorded in the blockchain 220 (as shown in steps 610-655 in FIG. 6A). The agreement associated with the transaction may be given a unique address for identification.

At step 678, the method 601 waits to receive information regarding the conditions relevant for the agreement. For example, the method 601 may wait to receive notification that $1000 was sent from a blockchain address associated with the tenant 110 and was received at a blockchain address associated with the landlord 115 by the $28^{th}$ of the current month. At step 680, if such a notification is not received, then the method 601 returns to step 678. However, if at step 680, a notification is received, then the method 601 proceeds to step 682.

At step 682, based on determining that the received notification satisfies the conditions needed to trigger execution of the various terms of the smart contract, the method 601 proceeds to step 684. However, at step 682, if it is determined that the received notification does not satisfy the conditions needed to trigger execution of the smart contract, then the method 601 returns to step 678. At step 683, the method 601 creates a transaction associated with execution of the smart contract. For example, the transaction may include information of the payment received, the date the payment was received, an identification of the tenant 110 and an identification of the landlord 115. The transaction may be broadcast to the blockchain network 130a and recorded in the blockchain 220 (as shown in steps 610-655 of the method 600 of FIG. 6A). If the transaction is successfully recorded in the blockchain 220, the transaction may be executed. For example, if the payment was received on the $28^{th}$, then an electronic receipt may be generated and sent to the tenant 110. However, on the last day of the current month, both the digital entry key and the rent are released respectively to the tenant 110 and the landlord 115.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information or may even go out of business.

Since blockchains are immutable, amending or updating a smart contract that resides in a blockchain may be challenging and thus, more expensive and/or more restrictive than with text-based contracts.

Internet of Things (IoT)

An IoT network may include devices and sensors that collect data and relay the data to each other via a gateway. The gateway may translate between the different protocols of the devices and sensors as well as manage and process the data. IoT devices may, for example, collect information from their environments such as motions, gestures, sounds, voices, biometric data, temperature, air quality, moisture, and light. The collected information sent over the Internet for further processing. Typically, IoT devices use a low power network, Bluetooth, Wi-Fi, or satellite to connect to the Internet or "the cloud". Some IoT related issues that blockchain may be able to detect include a lack of compliance in the manufacturing stage of an IoT device. For example, a blockchain may track whether an IoT device was adequately tested.

As discussed above, information from off-chain resources, including IoT devices, may be pushed to smart contracts via third party entities known as oracles. As an example, a smart refrigerator may monitor the use of an item stored in the refrigerator, such as milk. Various sensors within the refrigerator may be utilized for periodically determining an amount of milk stored in the refrigerator. A smart contract stored in a blockchain may indicate that if the weight of the stored milk falls below 10 ounces, then a new carton of milk is automatically purchased and delivered. The refrigerator sensors may periodically send their readings to a third-party service or oracle. The oracle may evaluate the sensor readings to determine whether the conditions for purchasing a new carton of milk have been met. Upon determining that the weight of the stored milk is below 10 ounces, the oracle may push information to the smart contract indicating that the condition for executing the smart contract has been met. The smart contract may be executed, and a new carton of milk may be automatically purchased. Both the execution of the smart contract and the purchase of the new carton may be recorded in the blockchain. In some cases, the condition may be an occurrence of an event, such as a need or anticipated need, or convenience factors, such as a delivery day, cost, promotions, or incentives.

Some issues related to the integration of blockchain into IoT include speed of transactions and computational complexity. The speed at which transactions are executed on the blockchain may be important when IoT networks with hundreds or thousands of connected devices are all functioning and transacting simultaneously. IoT devices are generally designed for connectivity rather than computation and therefore, may not have the processing power to support a blockchain consensus algorithm, such as proof of work. IoT devices also tend to be vulnerable to hacking via the Internet and/or physical tampering. For example, IoT devices may be more vulnerable to DDoS and malware attacks. Hackers may target a specific network and begin spamming the network with traffic within a short amount of time. Because of the increased surge in traffic, the bandwidth may be quickly overloaded, and the entire system may crash.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, a ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the token(s) at the address. Thus, the blockchain address may represent an identity of the person that owns the token(s). Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

As discussed above, a token may implement a token standard. For example, a token may be implemented according to the ERC-20 standard, the ERC-721 standard, the ERC-994 standard, the ERC-998 standard, the ERC-1155 standard, and/or any other token standard configured for the Ethereum blockchain network or other blockchain network that includes a virtual machine for executing contract bytecode on its blockchain as would be apparent to one of skill in the art in possession of the present disclosure. Each token standard may have different requirements of features that a token must have to be considered a token that implements that standard and that can be used by smart contracts or applications that also are generated according to the token standard. For example, a token that implements the ERC-20 standard is a fungible token and must have six mandatory rules of: totalSupply, balanceOf, transfer, transferFrom, approve, and allowance. In other examples, a token that implements the ERC-721 standard is a non-fungible token. As would be apparent to one of skill in the art in possession of the present disclosure, a fungible token is a token that is indistinguishable from another token of the same type while a non-fungible token would be a unique token that can be distinguished from another token. A token that implements the ERC-994 standard and the ERC-994 standard may be a non-fungible token and may be hierarchical with other tokens that implement the ERC-994 standard. In other words, the tokens may form a tree-like structure of parent/child non-fungible tokens. In yet other examples, tokens that implement the ERC-1155 standard may be minted from a single smart contract, rather than a smart contract for each token as is required in many of the other standards. As such, the smart contract that implements the ERC-1155 standard has the ability to generate both non-fungible and fungible tokens.

As discussed above, tokens and smart contracts that implement these token standards are tag-based and derived by APIs. Thus, composability of these token standards occurs with an API. For example, if a first smart contract generates a token that implements the ERC-20 standard, that first smart contract may be used by other smart contracts or that first smart contract may interface with existing smart contracts on the blockchain to use or interact with the existing smart contracts from within the first smart contract utilizing APIs. However, these tag-based tokens are much more difficult to address the notions of shareability and trustability when utilizing APIs for composability of tokens. As discussed above, the notions of shareability and trustability assist in bridging the gap between the digital world and the physical world and allowing disparate, siloed entities to communicate with each other.

For example, ERC-xxxx(s) is a guideline to define functions, but the implementation can be non-standardized, leading to further ambiguity (conflict of definition under implementation) and confusion. The interface forces users to only use a fix of standards. Users keep adding to the token standards, and it becomes complex and untraceable very quickly. For example, ERC-20 is corrected with ERC-223 and then some other workarounds. Some functions are there, and people may not be able to find them and in which ERC-xxxx, redundancy can happen very easily, creating fragile definitions. The non-fungible tokens produced are also a static list of values.

In various embodiments of the present disclosure, a non-fungible token that implements a programmable grammar-based syntax standard rather than the tag-based standards of conventional token standards is described. For example, the programmable grammar-based syntax standard may allow for the use of mathematical operators (e.g., addition, subtraction, unions, intersections and/or other mathematical operators that would be apparent to one of skill in the art in possession of the present disclosure), to describe relationships (e.g., Venn relationships) between a non-fungible tokens and/or a smart contract that implements the programmable grammar-based syntax standard and other tokens (e.g., fungible or non-fungible) and/or smart contracts that implement the programmable grammar-based syntax standard of the present disclosure. In contrast, the conventional token standards described above do not use mathematical operators and instead rely on proprietary tags such as function calls to other tokens and/or contracts. These tags and APIs are not required for the programmable grammar-based syntax standard. The redundancy of conventional token standards can be reduced by using the composite operators/syntax logic operator based on the condition of trustability or shareability, (e.g. compare ['reference to user1's secret domain' ∩'reference to user2's secret domain'] with ['123', '456', '789']).

Figure 7:
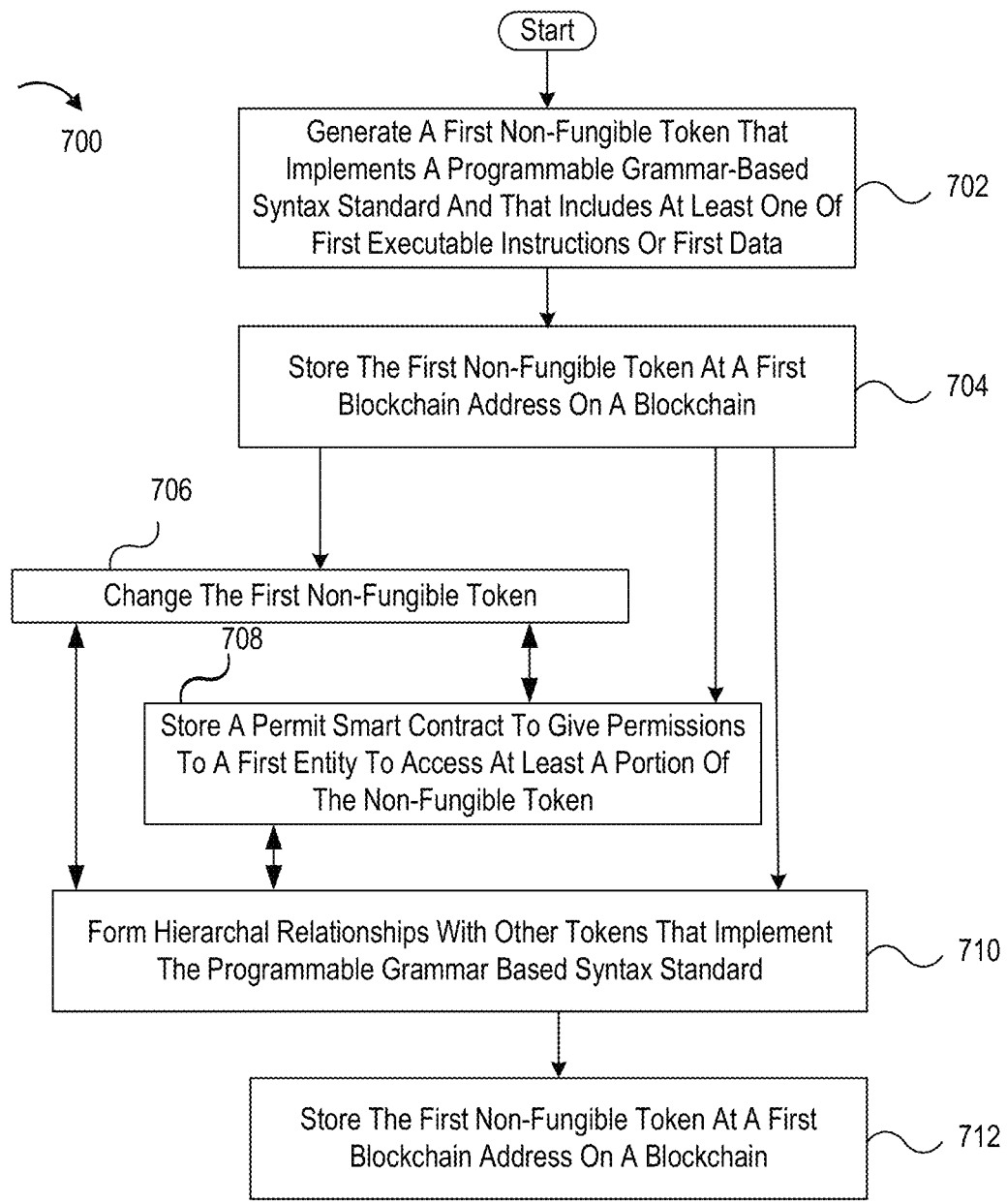
FIG. 7 is a flow diagram showing steps of an example method for non-fungible token generation that implements programmable grammar-based syntax according to an embodiment of the present disclosure.

Referring now FIG. 7, a method 700 of non-fungible token generation and use is illustrated, according to various embodiments. Operations described relative to FIG. 7 may be performed, in various embodiments, by any suitable computer system and/or combination of computer systems, included in non-fungible token system 100 of FIG. 1. For convenience and ease of explanation, however, operations described below will simply be discussed relative to the nodes 205b-205e, 205g, and/or 205h or virtual machines hosted by the nodes 205b-205e, 205g, and/or 205h of the blockchain network 200 of FIG. 2, which may be any of the blockchain networks 130a, 130b, and/or 130c of FIG. 1, or the client devices 120 and/or 125 of the non-fungible token system 100 of FIG. 1. Further, various elements of operations discussed below may be modified, omitted, and/or used in a different manner or different order than that indicated. Thus, in some embodiments, one or more of the nodes 205a-205h and/or the client devices 120 and/or 125 may perform one or more aspects described below, while another system might perform one or more other aspects.

The method 700 may begin at step 702 where a first non-fungible token is generated, where the token implements a programmable grammar-based syntax standard, and includes at least one of first executable instructions or first data. In an embodiment, at step 702, a processing system included in the client device 120 and/or 125 may execute instructions that provide a token generator that generates a first non-fungible token that implements the programmable grammar-based syntax standard of the present disclosure. For example, the client device 120 and/or 125 may house a processing system (not illustrated, but which may include the processor 1203 discussed below with reference to FIG. 12) and a memory system (not illustrated, but which may include the memory 1215 discussed below with reference to FIG. 12) that is coupled to the processing system and that includes instructions that, when executed by the processing system, cause the processing system to provide a token generator that is configured to perform the functionality of the token generator and/or computing devices discussed below. However, in other embodiments, the client device 120 and/or 125 may have previously generated a smart contract that implements the programmable grammar-based syntax standard and that is configured to generate the first non-fungible token upon certain conditions being satisfied. The smart contract may be uploaded or submitted to the blockchain network 130a as a transaction according to step 676 of the method 601 that is described in FIG. 6B above such that the method 601 is performed and the first non-fungible token that implements the programmable grammar-based syntax standard is created as a result of step 684 of method 601.

While embodiments of the present disclosure describe non-fungible tokens that implement a programmable grammar-based syntax standard, it is envisioned that fungible tokens may also implement the programmable grammar-based syntax standard. Relationships between those fungible tokens and/or the non-fungible tokens may also be made. In various embodiments, the programmable grammar-based syntax standard may require that the first non-fungible token and/or a smart contract that implements the programmable grammar-based syntax standard utilizes grammar-based syntax (e.g., mathematical operators). These standard operators may be placed in formal verification easily. The grammar-based syntax may be programmable such that the non-fungible token may be updated or include a portion of its data and/or executable instructions that are updated. In various embodiments, the non-fungible token includes a first updatable programmable section such that a first portion of the at least one of the first executable instructions or the first data is stored, according to the grammar-based syntax standard, in the first updatable programmable section.

In various embodiments, the programmable grammar-based syntax standard may require that the first non-fungible token and/or a smart contract that implements the programmable grammar-based syntax standard includes an identity of an entity (e.g., a machine, a person, and/or organization) that is the owner of the first non-fungible token or the entity that is "tied" to or associated with the first non-fungible token. As such, the programmable grammar-based syntax standard may have an identity requirement that the first non-fungible token must implement. For example, and as discussed in more detail below, the identity of an entity may be provided by a digital certificate embedded in the first non-fungible token. The digital certificate proves the identity of the entity. As would be appreciated by one of skill in the art, the digital certificate is an electronic document used to prove ownership of the first non-fungible token, which may include information about the token, information about the identity of its owner (e.g., the entity/subject), and a digital signature of a second entity (e.g., an issuer) that has verified the contents of the digital certificate. While an attestable identifier is assumed, the non-fungible token may include the logs of how the identifier for the entity has been attested and by whom. This may provide accountability of the auditor, for which the organization is responsible. In some examples, the system may have to associate the root trust with digital certificates just as how the digital certificates are embedded in some operating systems for internet transactions.

In various embodiments, the programmable grammar-based syntax standard may require that the first non-fungible token and/or a smart contract that implements the programmable grammar-based syntax standard is hierarchical such that parent/child node relationships can exist between the first non-fungible token and other fungible or non-fungible tokens that implements the programmable grammar-based syntax standard. As such, the programmable grammar-based syntax standard may have a hierarchical requirement that the first non-fungible token and/or a smart contract must implement.

FIG. 8 illustrates an example non-fungible token 800 that implements the programmable grammar-based syntax standard, according to an embodiment of the present disclosure. While existing token standards describe specific aspects that are tag based, the programmable grammar-based syntax standard that enables the non-fungible token 800 may include attributes of "who," "what," and "how," which may be a requirement of the programmable grammar-based syntax standard to ensure that the non-fungible token defines these functions. For example, the identification field 802 and the certificate field 804 may prove the identity of the entity (e.g., "who") associated with or that owns the non-fungible token 800. In a specific example, the entity that owns the non-fungible token 800 may be "ML_23", as provided in the identifier field 802 and the certificate field 804 may include the digital certificate for the entity.

The permit field 806, the shareable field 808, and the object field 814 may state what the identified entity is allowed to do or can do and also what conditions the entity is subjected to such as conditions that need to be satisfied before the actions are to be allowed. For example, if the non-fungible token 800 is owned by a visitor of an amusement park, the permit field 806 may identify which parks the visitor has access to, which rides the visitor can ride, which days the visitor has access, and/or other permissions and conditions for those permissions. In the illustrated example, the entity may have permissions to "room 77", "computer 11", APIs "data_file_000aa_access", "data_field_0055_update", "data_field_0023_view", and data "file_00aa", "field_0055", "field_0023", and so on. Furthermore, the data that can be shared is in the sharable field 808 and other conditions for the permissions of sharing may be limited to "not after 1800 hr." The permit field 806 may be signed by the owner of the non-fungible token 800, which authenticates the identified entity's access and authorization to the data, executable instructions, and/or other resources.

In various embodiments, the subject field 810 and the interface field 812 may describe the "how" attribute, which may describe the protocols and means that the permitted actions are subject to. In the illustrated example, the QR code may be needed to unlock the non-fungible token 800 or otherwise access the permitted actions. The non-fungible token 800 may also include a signature 816 that is signed by private key and/or public key that is associated with the owner of the non-fungible token. The key usage should be clearly defined. According to A6 (Authentication, Attestation, Authorization, Access, Audit, and data Assertions), there may be six different forms of keys. The keys may also come in the form of a non-fungible token json format promising what it is used for and at what condition. As such, the key may be a new form of an X509 digital certificate, but with extension of formats indicating the contractual conditions and contextual usage of the key. Even the definition of key lifecycle and the state the key is currently in the lifecycle can be embedded in the non-fungible 800 as a form of contractual permit.

The non-fungible token 800 may need to be resigned and repackaged for authentication of the non-fungible token 800 when any of the fields are updated. For example, the owner may update the shareable field 808 to add/change: data, executable instructions, entities that have access to the shareable field 808, tokens, smart contracts that can access the shareable field 808 or that the non-fungible token 800 can access, conditions, and/or any other updates to the non-fungible token 800 or portion of the non-fungible token 800. As discussed above, ERC-xxxs are fixed standards of defined functions, and if users keep adding, these conventional token standards will become redundant . The grammar-based syntax of the non-fungible token 800 are standardized in formal notations, and grammar-based syntax are only recommended to be extensible when normalized after peer review (this can be also reached a voting consensus via non-fungible token proposal and canonization). In a specific example, the non-fungible token 800 can encapsulate the definition and expected behavior of the operators and operations. It is also in the definitions that the non-fungible token can be subjected under/during operations (e.g., embedded code-signed scripts or binaries).

Referring back to FIG. 7, the method 700 then proceeds to step 704 where the first non-fungible token is stored at a first blockchain address on a blockchain. In an embodiment, at step 704, the client device 120 and/or 125 or the smart contract that generates that first non-fungible token may store the non-fungible token on a blockchain. For example, the non-fungible token may be recorded at a blockchain address of a blockchain 220 in the blockchain network 200 of FIG. 2. The entity that owns the private key corresponding to the blockchain address may access the non-fungible token at the blockchain address.

The method 700 then proceeds to step 706 where the first portion of the at least one of the first executable instructions or the first data in the first updatable programmable section of the first non-fungible token stored at the first blockchain address is subsequently changed to at least one of second executable instructions or second data. In an embodiment, at step 706, the client device 120/125 may access the first non-fungible token using the owner's private key that is associated with the blockchain address at which the first non-fungible token is stored. The owner of the first non-fungible token may then edit any of the first updatable programmable sections such that any of the first portion of the at least one of the first executable instructions or the first data is changed (e.g., deleted, updated, addition of new first executable instructions and/or data, and/or other changes), according to the grammar-based syntax standard, in the first updatable programmable section. For example, any of the data or instructions in the shareable field 808 of the non-fungible token 800 of FIG. 8 may be changed. Specifically, the API's or the data that may be shared with non-owners of the non-fungible token may be defined or changed. For example, the data "field_0055" may be added to the shareable field 808 to share that data with any of the shared parties identified by the digital certificates, which may also be added or removed. The non-fungible token with the updated data and/or updated instructions is then repackaged and resigned by the owner of the non-fungible token. For example, the signature 816 of the non-fungible token 800 is changed based on the change in fields. The updated non-fungible token is then stored at a blockchain address of the next block in the blockchain. For privacy, some fields have references only (e.g., it points to an authorized source of keep.

When updating smart contracts or the non-fungible token 800, the mutability is in terms of re-definition, such as how the Venn context is redefined for shareability and trustability.

Using Venn domains and Merkle levels additional non-fungible tokens 800 and/or smart contracts can be generated that mask or otherwise re-define data/instructions of previous non-fungible tokens and/or smart contracts.

The logic premises promised by the non-fungible token may not be changed, (e.g. ['reference to user1's secret domain']∩'reference to user2's secret domain']===>['reference to user2's secret domain']//only user2's domain is shareable now. However, the contents of the domains are also subjected to changes, hence, when any contents in the domains are changed, or the logic premises have changed, there must be re-signature to define the promises held by the non-fungible token. Thus, the mutability is in the two forms. Privacy is also assured as there is no explicit static or tagged list as found in conventional token standards, but references are bound by signature of what is promised in the contents pointed by the references. Upgradeability is also something that currently exists for existing ERC-20 contracts and those conventional methods of upgradeability may be implemented herein (e.g., OpenZepplin Upgrade Plugins, using proxy contracts and implementation contracts, and/or any other smart contracts/token upgrade mechanisms apparent to one of skill in the art in possession of the present disclosure).

In various embodiments, the method 700 may proceed from step 704 to step 708 or the method 700 may proceed from step 706 to 708. One of skill in the art in possession of the present disclosure will recognize that 706 or 708 may occur at any time after the first non-fungible token is stored at the blockchain address. At step 708, a permit smart contract that uses mathematical operators to give permission to a first entity to access at least a portion of the at least one of the first executable instructions or the first data provided in the first non-fungible token may be stored on a second blockchain address on the blockchain. In an embodiment, at step 708, the client device 120 and/or 125 or another smart contract stored on the blockchain may generate a permit smart contract that implements the programmable grammar-based syntax standard and store that permit smart contract on a blockchain address. As such, the permit smart contract may include mathematical operators that define data and/or instructions on the first non-fungible token that is accessible to at least one entity other than the owner of the first non-fungible token. In various embodiments, the mathematical operators may define which of the first data and/or the first executable instructions in the first non-fungible token that is accessible to the at least one entity. The first non-fungible token may sign the permit smart contract with a non-fungible token public key.

In various embodiments, there may be a plurality of non-fungible tokens that are stored at respective blockchain addresses on the blockchain. In some embodiments, the permit smart contract that implements the programmable grammar-based syntax standard may include mathematical operators that define data and/or instructions on the first non-fungible token, a second non-fungible token, a third non-fungible token, and/or any other number of non-fungible tokens that is accessible to at least one entity other than the owner of the first non-fungible token. For example, the mathematical operators may include unions, intersections, embeddings, and/or any other defined mathematical functions (e.g., selected extracts, and ciphered certain attributes, etc.). The binaries may be signed and embedded for audit where and when needed.

Figure 9:
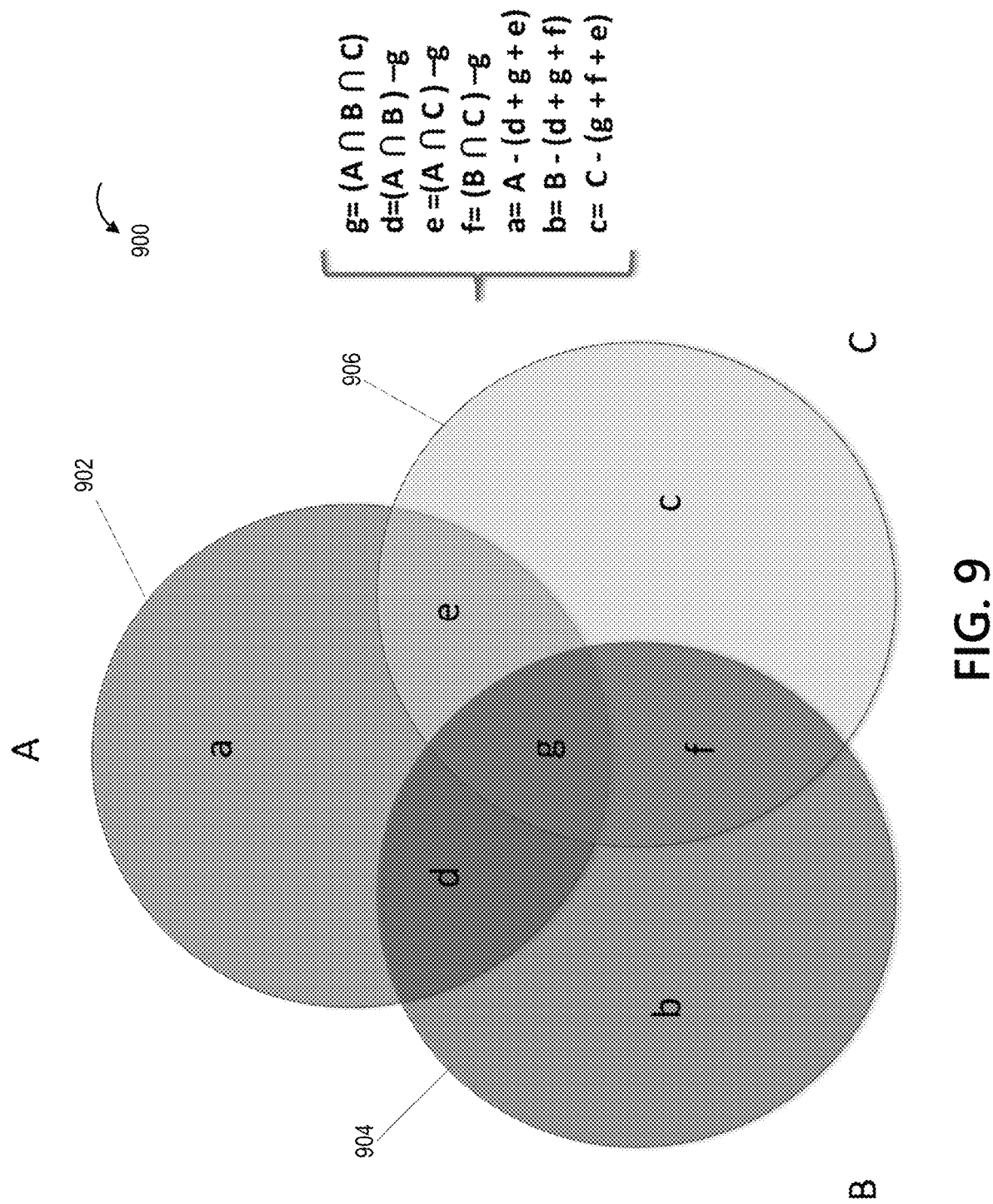
FIG. 9 shows an example of a relationship graph that can be used to define permissions to a plurality of non-fungible tokens according to mathematical operators permitted by the programmable grammar-based syntax implemented by the non-fungible token.

For example and referring now to FIG. 9, a Venn diagram 900 of data and/or executable instructions from each of a first non-fungible token 902, a second non-fungible token 904, and a third non-fungible token 906 is illustrated. The first non-fungible token 902 may include the data set and/or instruction set "A." The second non-fungible token 904 may include the data set and/or instruction set "B." The third non-fungible token 906 may include the data set and/or instruction set "C." Relations can be defined between the sets A, B, and C using mathematical operations. For example, $g=(A∩B∩C)$, $d=(A∩B)-g$, $e=(A∩C)-g$, $f=(B∩C)-g$, $a=A-(d+g+e)$, $b=B-(d+g+f)$, and $c=C-(g+f+e)$. The permit smart contract may include just the relationship of the sets A, B, and/or C. The non-fungible tokens 902, 904, and/or 906 and/or the owners of those tokens may sign the permit smart contract with respective cryptographic keys and store the permit smart contract on the blockchain. The signing of the permit smart contract generates a public key that is issued for the permit smart contract and is provided to any entity that is permitted to access the relationship defined by the mathematical operators in the permit smart contract. For example, if the owners of the non-fungible tokens 902, 904, and/or 906 decide to provide a first entity access to the data represented by "g," then the relationship $g=(A∩B∩C)$ may be stored on the blockchain at a blockchain address in the permit smart contract along with the blockchain address of the non-fungible tokens 902, 904, and/or 906 and signed by the keys associated with the non-fungible tokens 902, 904, and/or 906 such that a public key is generated for the entity that is assigned permission to access "g". As such, the entity may use the public key to obtain the permission in the permit smart contract such that the entity may access the data and/or instructions defined by "g" in the non-fungible tokens 902, 904, and 906 Thus, mathematical operators may be used to define relationships that identify entities that have permission to access a token, a portion of that token, or portions of multiple tokens.

Referring back to FIG. 7, the method 700 may then proceed to step 710 where the programmable grammar-based syntax standard enables tokens to form hierarchal relationship with each other. For example, the first non-fungible token may be in a hierarchical relation with a second token (e.g., fungible or non-fungible) that implements the programmable grammar-based syntax standard.

Figure 10:
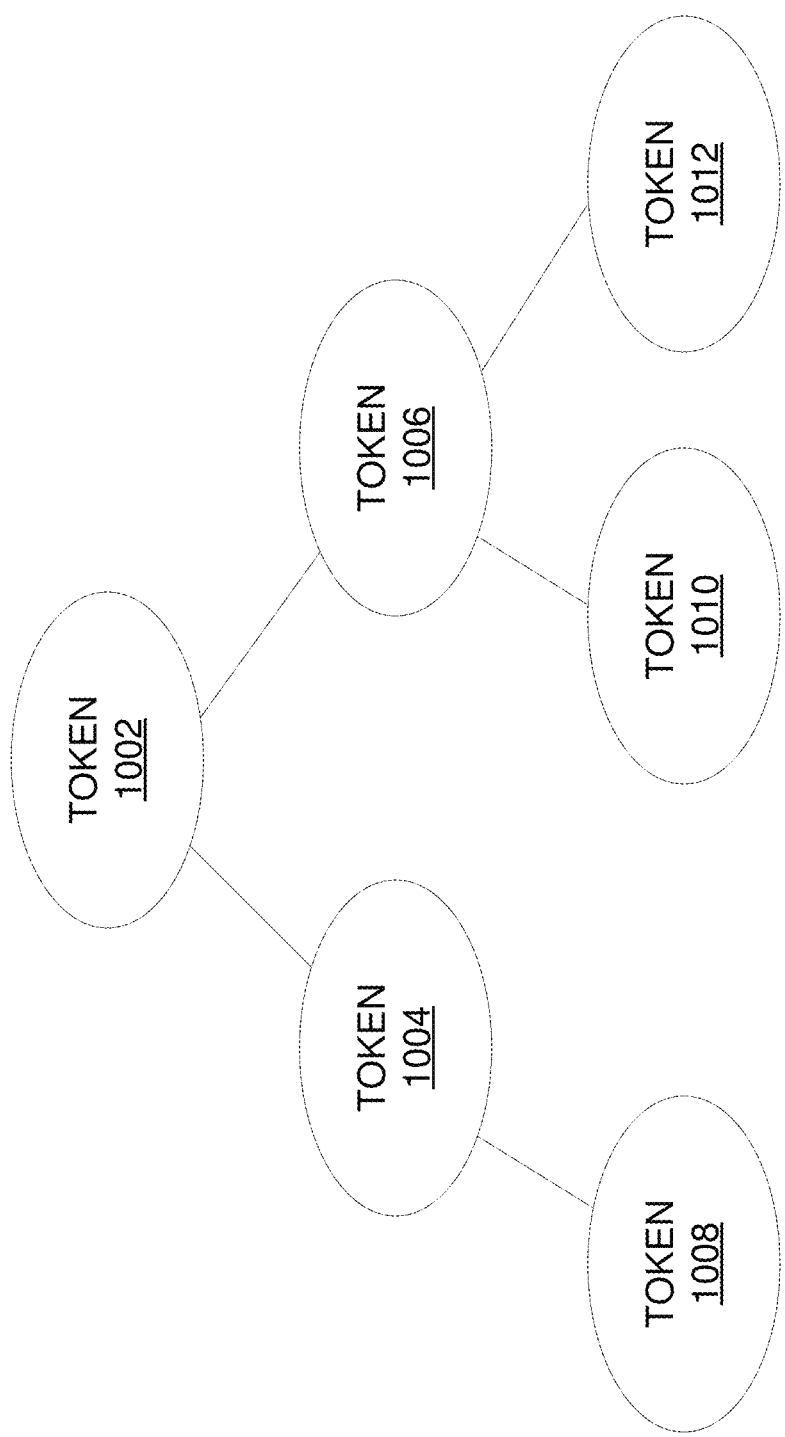
FIG. 10 shows an example hierarchal tree of tokens that can be created using tokens that implement the non-fungible token programmable grammar-based syntax standard.

With reference to FIG. 10, a token hierarchy 1000 is illustrated where the programmable grammar-based syntax in a non-fungible token 1002 may define permissions or ownership of a non-fungible token 1004 and/or a non-fungible token 1006 that both implement the programmable grammar-based syntax standard. Similarly, the programmable grammar-based syntax in the non-fungible token 1004 may define permissions or ownership of a token 1008, which may be non-fungible or fungible and implements the programmable grammar-based syntax standard. Similarly, the programmable grammar-based syntax in the non-fungible token 1006 may define permissions or ownership of a token 1010 and a token 1012, which may be non-fungible or fungible and may implement the programmable grammar-based syntax standard. In a use case example, the token 1002 may represent a user's digital vault or room and the underlying tokens may be collectibles or assets in that room and assets of those assets. Other use cases that may use a hierarchy are user profiles where various information about an entity is tied to a root non-fungible token for that entity.

While the mathematical operators may be presented in the tokens 1002-1012 to define the hierarchal relationship, as discussed above, a permit smart contract may define a hierarchy of tokens. For example, a token may be embedded in another token which itself may include one or more embedded tokens. In other examples, a token may have certain permissions to another token that may be shared with another entity and that entity's token. By providing the hierarchal relationships, a handover (e.g., new owner recorded in the blockchain such that the first entity is not in control of the token) or a delegation (e.g., permission given to another token or a user to have specific rights over the root non-fungible token using a delegation key) of a root non-fungible token will result in the handover or a delegation of all the tokens under that root non-fungible token. In other examples, transfers or actions may be taken at tokens (e.g., non-fungible or fungible) under the root non-fungible token such that a portion of the tokens in the hierarchy are transferred or their actions performed.

Thus, in various embodiments of the present disclosure and with reference to steps 708 and 710, the programmable grammar-based syntax standard enables the non-fungible tokens to have conditional "bridges", e.g. sharing by means of union (∪), intersection (∩) or subset (embedding one non-fungible token in another, i.e. ⊂) or other defined functions (e.g. selected extracts, and ciphered certain attributes, etc.) to form a graphical network of non-fungible tokens or as a bundled form of non-fungible tokens. The graphical network of non-fungible tokens depicts the shareable interfaces of the non-fungible tokens to form the interoperability connection and relationship (such as trust relationships, e.g. express or suppress modes) using Venn relationships. The graphical network relationship is illustrated by the examples in FIG. 9.

The bundled form of non-fungible tokens may encapsulate or cross references data attributes in a hierarchy. This is the paradigm of composing composites (ERC-xxxx standards call this composable). This is the relationship depicted in FIG. 10. For example, a driver's license and a credit card shares {get_name} or driver license can be embedded into credit card as ID, or passport and national ID has shareable interfaces. This can be represented as a hierarchy describing users sharing data and encapsulating rights and access in the non-fungible tokens. Non-fungible tokens implementing the programmable grammar-based syntax standard can express that hierarchy as a composition.

An example use-case of these non-fungible tokens that implement programmable grammar-based syntax standard can be shown through an amusement park ecosystem. Attendees of the amusement park can purchase access based on both park availability (all global parks, all country parks, or just a specific park) as well as access length (daily pass, 3-day, week-long, monthly or annual subscription). Park access would demonstrate bundled form non-fungible tokens because there are many combinations that can be used to create this access pass. These non-fungible tokens would have the added benefit of being tied to collectibles which attendees could collate for their entire life similar to pin collecting.

For deeper levels of access, the amusement park use case above can be used as a further example of a graphical network of non-fungible tokens. For instance, a user's height/age represented by a non-fungible token can be tied to their access pass (e.g., another token) to express to individual rides whether they are eligible for access while suppressing this information to the rest of the world. This application could also be used for additional access within the parks to restrict certain areas/rides/restaurants to VIPs only. This could be taken an additional step further if a user wanted to set their food preferences or dietary restrictions so that when the user goes into restaurants, digital menus/kiosks can prioritize menu items.

Continuing with the amusement park example above and referring generally to the non-fungible token 800 of FIG. 8 and its fields, and FIG. 10 and its hierarchy of non-fungible tokens 1002-1012, any of which may be provided by the non-fungible token 800, an individual may own the non-fungible token 800 as identified by the identification field 802 and the certificate field 804. The permit field 806 may include instructions and data. For example, the child tokens of the non-fungible token may be listed, as well as permissions, information about the user (e.g., user's height/age), and/or any other instructions or data that would be apparent to one of skill in the art in possession of the present disclosure. That data and instructions may be expressed and/or suppressed using the sharable field 808. For example, digital certificates of the park or one or more rides may be listed in the sharable filed 808 and the data and/or instructions included in the object field 814 that is to be shared may be included in the shareable field 808. For example, certain rides may have access to the user's height and age while other rides or vendors in the park may not have access to the user's height and age. In other examples, non-fungible tokens embedded or linked to the root-non-fungible token may not be shared, and thus not in the sharable field 808 (e.g., a user's collectable may not be shared). However, a token that includes user dietary preferences may only be available to food vendors within the park but not to rides, which may be declared in the sharable field 808.

The simplest way to implement these hierarchical non-fungible tokens 1002-1012 would be for each non-fungible token 1002-1012 to have a property which contains an array of non-fungible tokens 'under' that non-fungible tokens 1002-1012. Using Merkle trees and a cache, a more optimized amusement park ecosystem may be contemplated. When accessing a user that is attempting to access a resource x (e.g., a particular park ride) with y non-fungible token, the user would provide their non-fungible token and the Merkle nodes needed to reconstruct the Merkle root, which may be the identifier of the non-fungible token (e.g., a root token or a particular child token that is a root of other tokens). From there, an amusement park computer system may attempt to construct the Merkle root. If this construction is successful, this non-fungible token does have access to the resource x because this means that the resource is a node below the non-fungible token's tree. Additionally, this is a massive improvement from O(n2) to O(1) because instead of each non-fungible token having to store all child nodes, the non-fungible token can store their fixed-size id.

In a specific example of using Merkle trees, the accessed resource at the park may receive an identifier of a root non-fungible token that may be a root hash of the user's token hierarchy 1000 from a user device. The accessed resource may determine whether that root hash is stored in a cache of authenticated users. If the root hash is stored in the cache, the accessed resource provides access to the user. If the root hash is not stored in the cache, the accessed resource may attempt to reconstruct the root hash from any child node hashes that the accessed resource has access to and any child node hashes that may be provided by the user device. If the accessed resource can reconstruct the root hash, then the user has access to the accessed resource. However, if the root hash cannot be reconstructed, then the accessed resource may deny access to the user.

Referring back to FIG. 7, the method 700 may then proceed to step 712 where the first non-fungible token is transferred from the first owner to a second owner. In an embodiment, at step 712, the client device 120 and/or 125 and/or a smart contract that implements that programmable grammar-based syntax standard may create a transaction to transfer the first non-fungible token from a first account of the first owner to a second account when a transfer condition is satisfied. As such, the first non-fungible token may be transferred as described above where the owner of a token may send or transfer the token to a new owner via a blockchain transaction. For example, the owner of the non-fungible token may sign the transaction corresponding to the transfer of the token with the private key. When the token is received by the new owner, the token may be recorded in the blockchain at the blockchain address of the new owner. Alternatively, in various embodiments of the present disclosure, when a transfer condition is satisfied, a permit smart contract may be generated or updates to the first non-fungible token may be made using the mathematical operators to define that the first account is no longer associated with the first non-fungible token while the second account is associated with the first non-fungible token. For example, if a full handover of the non-fungible token is set using the non-fungible token 800 example in FIG. 8, the non-fungible token credentials (e.g., the identification field 802 and the certificate field 804 of FIG. 8) and signature (e.g., signature field 816 of FIG. 8) may require refreshing to indicate the new owner. The blockchain (e.g., the blockchain 220) will record the history of the handover and the agreement is crossed signed by the 2 parties, i.e. giver and receiver.

Thus, systems and methods of non-fungible token generation and use have been described. Because the non-fungible tokens implement a programmable grammar-based syntax standard, benefits of shareability and trustability assist in bridging the gap between the digital world and the physical world and allowing disparate, siloed entities to communicate with each other and share their data. The programmable grammar-based syntax standard uses mathematical operators to provides functionality rather the limitations defined by static tags of tag-based token standards that utilize APIs to derive the tags. The mathematical operators permit the non-fungible tokens to be dynamic and updatable, form hierarchies with other tokens that implement the programmable grammar-based syntax standard, identify entities associated with the non-fungible token, and/or create suppress and express relationships for access to data and/or instructions included the tokens. The programmable grammar-based syntax standard also enables smart contracts to be embedded between and with the non-fungible tokens. These and other benefit may be recognized by one skill in the art in possession of the present disclosure.

Computing Device

Figure 11:
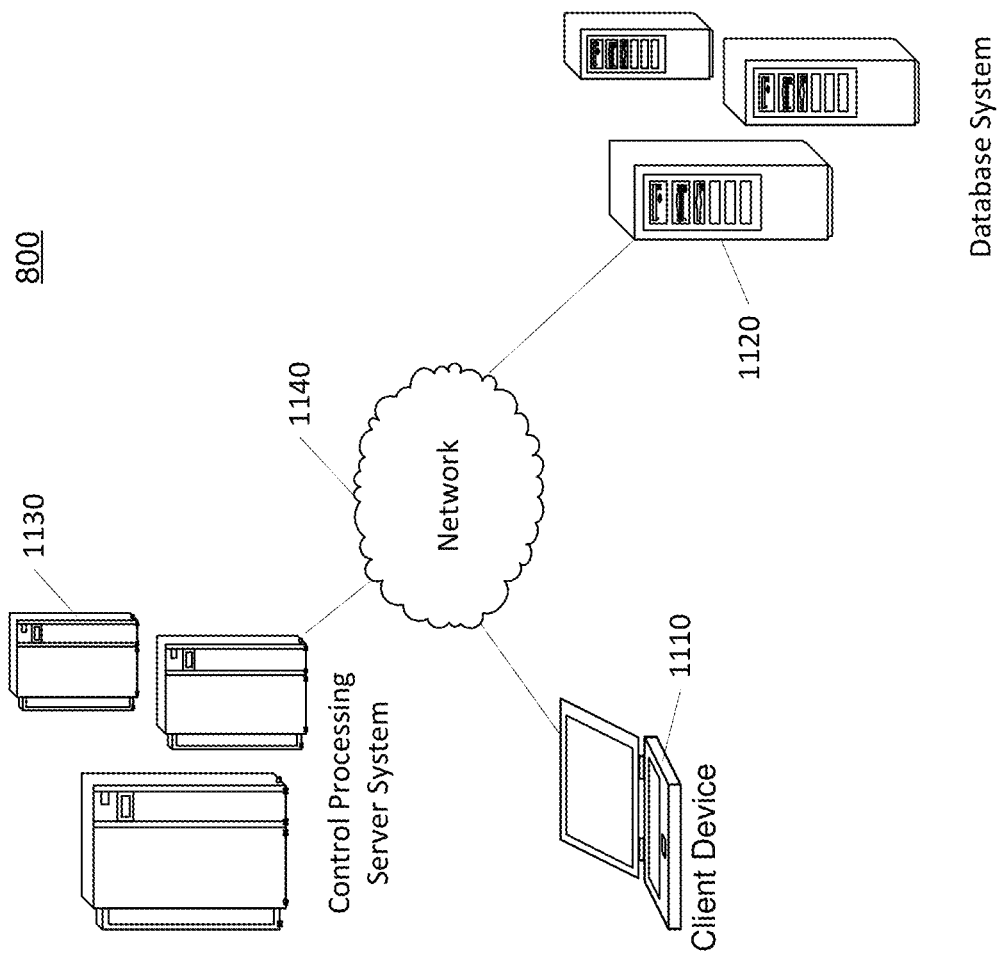
FIG. 11 is a block diagram that illustrates an example system.

FIG. 11 shows a system 1100. The system 1100 may include at least one client device 1110, at least one database system 1120, and/or at least one server system 1130 in communication via a network 1140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 11.

Client device 1110 may access server applications and/or resources using one or more client applications (not shown) as described herein. Client device 1110 may be a mobile device, such as a laptop, smart phone, mobile phones, or tablet, or computing devices, such as a desktop computer or a server, wearables, embedded devices. Alternatively, client device 1110 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 1120 may be configured to maintain, store, retrieve, and update information for server system 1130. Further, database system may provide server system 1130 with information periodically or upon request. In this regard, database system 1120 may be a distributed database capable of storing, maintaining, and updating large volumes of data across clusters of nodes. Database system 1120 may provide a variety of databases including, but not limited to, relational databases, hierarchical databases, distributed databases, in-memory databases, flat file databases, XML databases, NoSQL databases, graph databases, and/or a combination thereof.

Server system 1130 may be configured with a server application (not shown) that is capable of interfacing with client application and database system 1120 as described herein. In this regard, server system 1130 may be a stand-alone server, a corporate server, or a server located in a server farm or cloud-computer environment. According to some examples, server system 1130 may be a virtual server hosted on hardware capable of supporting a plurality of virtual servers.

Network 1140 may include any type of network. For example, network 1140 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 1100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 1100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 1100 in front of one or more computing devices such that any external devices may communicate directly with the specialized hardware.

Figure 12:
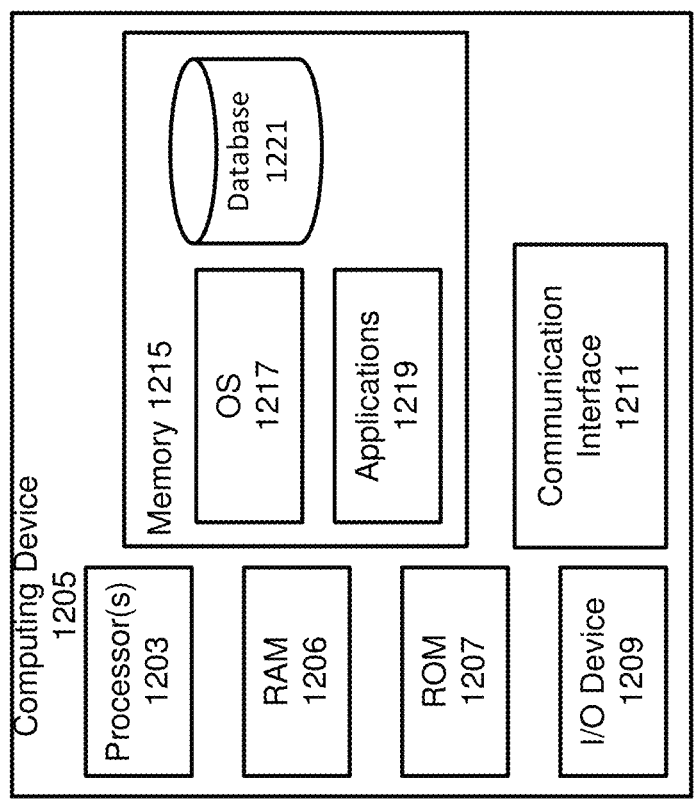
FIG. 12 is a block diagram that illustrates an example computing device.

Turning now to FIG. 12, a computing device 1205 that may be used with one or more of the computational systems is described. The computing device 1205 may include a processor 1203 for controlling overall operation of the computing device 1205 and its associated components, including RAM 1206, ROM 1207, input/output device 12011, communication interface 1211, and/or memory 1215. A data bus may interconnect processor(s) 1203, RAM 1206, ROM 1207, memory 1215, I/O device 1209, and/or communication interface 1211. In some embodiments, computing device 1206 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 1209 may include a microphone, keypad, touch screen, and/or stylus motion, gesture, through which a user of the computing device 1200 may provide input, and may also include one or more of a speaker for providing audio output and a video display device for providing textual, audiovisual, and/or graphical output. Software may be stored within memory 1215 to provide instructions to processor 1203 allowing computing device 1200 to perform various actions. For example, memory 1215 may store software used by the computing device 1200, such as an operating system 1217, application programs 1219, and/or an associated internal database 1221. The various hardware memory units in memory 1215 may include volatile and nonvolatile, removable and non-removable media implemented in any method or technology for storage of information such as computer-readable instructions, data structures, program modules, or other data. Memory 1215 may include one or more physical persistent memory devices and/or one or more non-persistent memory devices. Memory 1215 may include, but is not limited to, random access memory (RAM) 1205, read only memory (ROM) 1207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 1203.

Communication interface 1211 may include one or more transceivers, digital signal processors, and/or additional circuitry and software for communicating via any network, wired or wireless, using any protocol as described herein.

Processor 1203 may include a single central processing unit (CPU), which may be a single-core or multi-core processor, or may include multiple CPUs. Processor(s) 1203 and associated components may allow the computing device 1200 to execute a series of computer-readable instructions to perform some or all of the processes described herein. Although not shown in FIG. 12, various elements within memory 1215 or other components in computing device 1200, may include one or more caches, for example, CPU caches used by the processor 1203, page caches used by the operating system 1217, disk caches of a hard drive, and/or database caches used to cache content from database 1261. For embodiments including a CPU cache, the CPU cache may be used by one or more processors 1203 to reduce memory latency and access time. A processor 1203 may retrieve data from or write data to the CPU cache rather than reading/writing to memory 1215, which may improve the speed of these operations. In some examples, a database cache may be created in which certain data from a database 1221 is cached in a separate smaller database in a memory separate from the database, such as in RAM 1206 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 1205 are described separately, functionality of the various components may be combined and/or performed by a single component and/or multiple computing devices in communication without departing from the invention.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system related to non-fungible tokens, comprising:
a non-transitory memory; and
one or more hardware processors coupled to the non-transitory memory and configured to read instructions from the non-transitory memory to cause the system to perform operations comprising:
generating a first non-fungible token that implements a programmable grammar-based syntax standard and includes a first updatable programmable section, wherein the first non-fungible token includes at least one of first executable instructions or first data, and wherein a first portion of the at least one of the first executable instructions or the first data is stored, according to the programmable grammar-based syntax standard, in the first updatable programmable section;
storing the first non-fungible token at a first blockchain address on a blockchain; and
subsequently changing the first portion of the at least one of the first executable instructions or the first data in the first updatable programmable section of the first non-fungible token stored at the first blockchain address to at least one of second executable instructions or second data.

2. The system related to non-fungible tokens of claim 1, wherein the operations further comprise:
generating a first smart contract according to the programmable grammar-based syntax standard that utilizes mathematical operators to perform logic when referencing at least one of a second smart contract that implements the programmable grammar-based syntax standard or a token that implements the programmable grammar-based syntax standard; and storing the first smart contract at a second blockchain address on the blockchain, wherein the first smart contract performs the generating of the first non-fungible token.

3. The system related to non-fungible tokens of claim 1, wherein the operations further comprise:

generating a second non-fungible token that implements the programmable grammar-based syntax standard, wherein the second non-fungible token includes at least one of third executable instructions or third data, wherein a second portion of the at least one of the third executable instructions or the third data is included in a second updatable programmable section; and storing the second non-fungible token at a second blockchain address on the blockchain.

4. The system related to non-fungible tokens of claim 3, wherein the operations further comprise:

generating a permit smart contract that utilizes mathematical operators that provides permissions to a first entity to have access to at least a portion of the at least one of the third executable instructions, the third data, the second executable instructions, or the second data; and storing the permit smart contract at a third blockchain address on the blockchain.

5. The system related to non-fungible tokens of claim 1, wherein the first non-fungible token is in a hierarchical relation to a second token that implements the programmable grammar-based syntax standard.

6. The system related to non-fungible tokens of claim 5, wherein the hierarchical relation includes the first non-fungible token being a parent of the second token that is a child of the first non-fungible token that implements the programmable grammar-based syntax, wherein a parent/child relationship between the first non-fungible token and the second token is defined in a permit smart contract or in the first updatable programmable section of the first non-fungible token.

7. The system related to non-fungible tokens of claim 1, wherein the first non-fungible token enables an entity associated with the first non-fungible token to be identified.

8. The system related to non-fungible tokens of claim 7, wherein the first non-fungible token further includes first syntax formal statements, according to the programmable grammar-based syntax standard, that provide permissions to the entity associated with the first non-fungible token.

9. The system related to non-fungible tokens of claim 8, wherein the first non-fungible token further includes second syntax formal statements, according to the programmable grammar-based syntax standard, that enable a definition of one or more conditions to be satisfied to allow the permissions.

10. The system related to non-fungible tokens of claim 1, wherein the operations further comprise:

transferring the first non-fungible token from a first account to a second account, when a transfer condition is satisfied by using one or more mathematical operators to define that the first account is no longer associated with the first non-fungible token while the second account is associated with the first non-fungible token.

11. The system related to non-fungible tokens of claim 1, wherein the first non-fungible token does not use any application programming interfaces (APIs) to interact with other non-fungible tokens according to the programmable grammar-based syntax standard.

12. A method of non-fungible token generation, comprising:

generating, by a computing device, a first non-fungible token that implements a programmable grammar-based syntax standard, wherein the first non-fungible token includes at least one of first executable instructions or first data;

storing, by the computing device, the first non-fungible token at a first blockchain address on a blockchain; and storing, by the computing device, a permit smart contract at a second blockchain address on the blockchain that uses mathematical operators to give permission to a first entity to access at least a portion of the at least one of the first executable instructions or the first data provided in the first non-fungible token.

13. The method of claim 12, further comprising:

receiving, by the computing device through a network from a broadcast by a first transaction device, a first digital transaction that includes a plurality of digital transaction information;

identifying, by the computing device in the first digital transaction, a third blockchain address provided on the blockchain;

accessing, by the computing device on the blockchain via the first blockchain address, a first blockchain smart contract that is stored on the blockchain in association with the first blockchain address; and executing, by the computing device, the first blockchain smart contract, wherein the execution of the first blockchain smart contract causes the generating the first non-fungible token.

14. The method of claim 12, wherein a first portion of the at least one of the first executable instructions or the first data is included in a first updatable programmable section.

15. The method of claim 12, wherein the first non-fungible token is in a hierarchical relation to a second token that implements the programmable grammar-based syntax standard.

16. The method of claim 15, wherein the hierarchical relation includes the first non-fungible token being a parent of the second token that is a child of the first non-fungible token that implements the programmable grammar-based syntax standard, wherein a parent/child relationship between the first non-fungible token and the second token is defined in the permit smart contract or in an updatable programmable section of the first non-fungible token.

17. The method of claim 12, wherein the first non-fungible token further includes first syntax formal statements, according to the programmable grammar-based syntax standard, that provide a permission to the first entity associated with the first non-fungible token.

18. The method of claim 17, wherein the first non-fungible token further includes second syntax formal statements, according to the programmable grammar-based syntax standard, that enable a definition of one or more conditions to be satisfied to allow the permissions.

19. A method of non-fungible token generation, comprising:

generating, by a computing device, a first non-fungible token that implements a programmable grammar-based syntax standard, wherein the first non-fungible token includes at least one of first executable instructions or first data;

defining, by the computing device, a hierarchical relation to a second token that implements the programmable grammar-based syntax standard, wherein the hierarchical relation includes the first non-fungible token being a parent of the second token that is a child of the first non-fungible token that implements the programmable grammar-based syntax standard; and storing, by the computing device, the first non-fungible token at a first blockchain address on a blockchain.

20. The method of claim 19, wherein a parent/child relationship between the first non-fungible token and the second token is defined in a permit smart contract or in the first non-fungible token.

* * * * *